(12) United States Patent
Hiraoka et al.

(10) Patent No.: US 6,297,473 B2
(45) Date of Patent: *Oct. 2, 2001

(54) ARC WELDING METHOD

(75) Inventors: Kazuo Hiraoka; Terumi Nakamura, both of Ibaraki; Hideyuki Yamamoto, Osaka, all of (JP)

(73) Assignee: Japan as represented by Director General of National Research Institute for Metals, Ibaraki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/389,619

(22) Filed: Sep. 3, 1999

(30) Foreign Application Priority Data

Sep. 4, 1998 (JP) .................................................. 10-251144
Sep. 4, 1998 (JP) .................................................. 10-251145

(51) Int. Cl.$^7$ ...................................................... B23K 9/12
(52) U.S. Cl. ................................. 219/125.12; 219/137.7; 219/137 PS
(58) Field of Search ........................... 219/125.12, 130.5, 219/137 R, 130.51, 137.7, 137.71

(56) References Cited

U.S. PATENT DOCUMENTS

| 3,838,244 | * | 9/1974 | Petrides et al. | .................. 219/130.51 |
| 4,037,078 | * | 7/1977 | Oishi et al. | ...................... 219/137 R |
| 4,091,258 | * | 5/1978 | Kano et al. | ...................... 219/125.12 |

* cited by examiner

Primary Examiner—Clifford C. Shaw
(74) Attorney, Agent, or Firm—Wenderoth, Lind & Ponack, L.L.P.

(57) ABSTRACT

In order to provide a welding system capable of freely controlling dispersion and concentration of arc heat input at a groove face of base material, and ensure melting of the base material while restraining excessive weld heat input, in arc welding using a wire consumable electrode system, at a groove between members to be welded a position of a weld torch or feed speed of a wire is periodically varied, and welding is carried out by controlling a difference between the phase of the variation and a phase of an arc current waveform in accordance with a change in the arc current waveform.

6 Claims, 25 Drawing Sheets

$\theta = 0$ $\theta = -\pi/4$ $\theta = -\pi/2$ $\theta = -3\pi/4$ $\theta = -\pi$ $\theta = -3\pi/2,\ \theta = \pi/2$ $\theta = \pi$ $\theta = \pi/4$ $\theta = 5\pi/8$ $\theta = 5\pi/4 = -3\pi/4$ Cycle of setting voltage of power supply : 0.4s Wire feed ratio : Constant $\theta = -\pi/2$ $\theta = -\pi/4$ $\theta = \pi/2$ $\theta = \pi/4$ $\theta = \pi/2$ $\theta = \pi$ $\theta = -\pi/2$ $\theta = 0$ $\theta = \pi/4$

ARC WELDING METHOD

BACKGROUND OF THE INVENTION

1. Field of the Invention

The present invention relates to an arc welding method. More particularly, the invention relates to a welding method with high efficiency and high quality, which is featured in that in a groove an arc generating point of a filler wire (distal end of a filler wire) is oscillated in the up and down direction, and an arc power density distribution at a groove face of base material is freely controlled.

2. Description of Related Art

It has conventionally been known in arc welding that sufficient arc heat input needs to be provided to a root portion of a groove in order to prevent a weld defect such as lack of fusion at a narrow gap portion (a root portion) of a narrow gap joint of an I, V, or K type. However; when a welding method having large weld heat input is used to sufficiently melt the root portion of a groove, there poses problems of deterioration in mechanical properties and deformation of the welded joint by a thermal cycle in the welding process. It is indispensable for resolving the problem to pertinently control dispersion and concentration of heat imput in the groove.

However, although various devices have been tried conventionally, it is not easy to freely control arc heat input distribution, and welding with high efficiency and high quality by enabling the control still poses a serious problem in an arc welding method.

SUMMARY OF THE INVENTION

Hence, according to the invention, in order to resolve the above-described problems, according to the first aspect of the invention, there is provided an arc welding method with a consumable electrode, wherein an arc welding operation performed by a wire consumable electrode system is carried out by controlling oscillation of a weld torch periodically in an arc axis direction (Z direction) at a groove between members to be welded. Further, according to the second aspect of the invention, there is provided an arc welding method of a consumable electrode type, wherein an arc welding operation performed by a wire consumable electrode system is carried out by controlling oscillation of a weld torch periodically in an arc axis direction at a groove between members to be welded, and by controlling a difference between a phase of a periodical variation in the position and a phase of a periodical variation of an arc current when the external characteristics of power source is periodically changed.

Further, in respect of the second aspect of the invention, the invention provides a method of carrying out a direct current arc welding operation by changing an arc current periodically as the third aspect of the invention, a method of carrying out an alternating current arc welding operation by changing the polarity of filler wire as the arc characteristics as the fourth aspect of the invention, a method of carrying out the arc welding operation by changing a current waveform as the fifth aspect of the invention, and a welding method in which a period of a variation of a position of a distal end of a wire of a weld torch and a period of a variation of the arc current are combined as the sixth aspect of the invention.

Further, according to the invention, in order to resolve the above-described problems, according to the seventh aspect of the invention, there is provided an arc welding method using a consumable electrode, wherein an arc welding operation performed by a wire electrode system is carried out by periodically varying a wire feed speed and controlling a difference between a phase of the wire feed speed variation and a phase of an arc current characteristic when the arc current is changed at a groove between members to be welded.

Further, in respect of the seventh aspect of the invention, the invention provides a method of carrying out a direct current arc welding operation by changing an arc current as the eighth aspect of the invention, a method of carrying out an alternating current arc welding operation by changing the polarity of a filler wire as the arc characteristics as the ninth aspect of the invention, a method of carrying out the arc welding operation by changing a current waveform as the tenth aspect of the invention, and a welding method in which a period of a variation of a position of a distal end of a wire of a weld torch and a period of a variation of the arc current are combined as the eleventh aspect of the invention.

DETAILED DESCRIPTION OF THE INVENTION

According to the first aspect of the invention, it is the most essential feature to oscillate a weld torch in an arc axis direction (Z direction). Further, in this case, "arc axis direction" may be changed to be expressed as a length direction of a wire. Further, the oscillation of the weld torch signifies oscillation on the premise that the feed speed of the weld wire is constant.

Further, according to the second through the sixth aspects of the invention, there is provided an arc welding method using a consumable electrode capable of controlling a range of behavior or an arc generating point (a distal end of a weld wire) and a moving speed, and arbitrarily forming a heat input distribution at a groove face while pertinently inputting heat energy to a root portion of the groove by making a weld pulse current cooperate with oscillation of a position of a weld torch.

Further, according to the seventh through the eleventh aspects of the invention, a feed speed of a filler wire is periodically varied, and an arc generating point of the filler wire (a distal end of the wire) is oscillated in the Z direction. The invention provides an arc welding method of a consumable electrode type capable of arbitrarily forming an arc heat input distribution of a groove face while pertinently inputting heat energy to a bottom portion of the groove by controlling a range of behavior of an arc heat input point (a distal end of a weld wire) and a moving speed thereof by making a weld pulse current cooperate with the oscillation.

According to the welding method of the invention as described above, the heat input distribution in the groove can pertinently be controlled, and accordingly, there can be carried out a welding operation of a structure preserving type which does not deteriorate the characteristics of a base material by avoiding excessive heat input thereto. Further, the invention is effective in a consumable type electrode welding operation (MIG, MAG, $CO_2$, SAW) for an ultra narrow gap groove having a groove width of 10 mm or less, which is difficult to operate conventionally. Further, the invention is effective in a reduction in deformation or residual stress since a molten region in welding and a heat affected zone can be minimized.

The invention is provided with the above-described features and a detailed explanation will be given of embodiments of the invention as follows.

Embodiment 1

Figure 1:
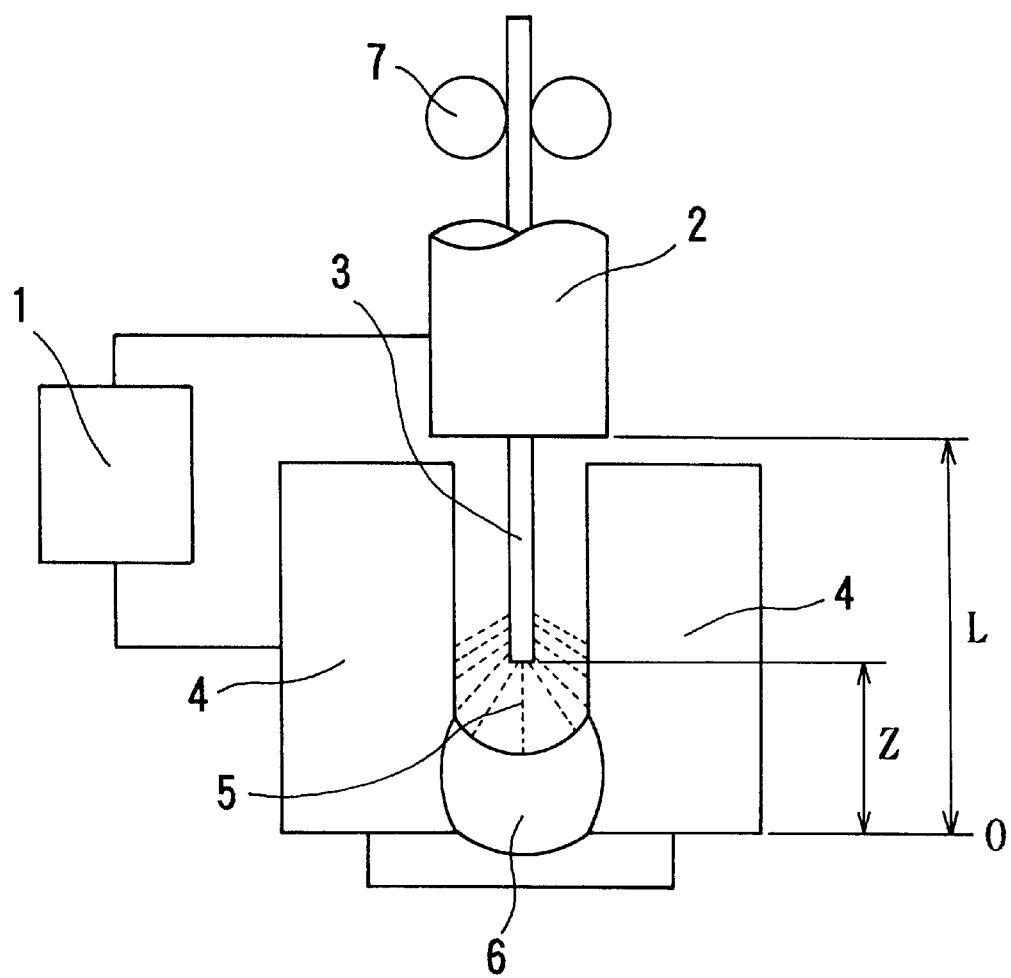
FIG. 1 is an outline view exemplifying a constitution of a weld apparatus.

First, FIG. 1 exemplifies a welding apparatus capable of being used in the method according to the first through the sixth aspects of the invention. According to the apparatus of FIG. 1, there are installed a weld torch (2) connected to a power source (1) and a wire feed apparatus (7) for feeding a filler wire (3) as a consumable electrode via the weld torch (2). Further, the weld torch can be oscillated in an axial direction of arc (5) generated inside of a groove between members (4) to be welded for forming a narrow groove joint. That is, oscillation occurs in the up and down direction of FIG. 1 shown by the arrows.

The feed speed of the wire (3) by the wire feed apparatus (7) stays constant.

According to a conventional welding method, for example, a distance (L) from a surface of the members (4) to the weld torch (2) shown by FIG. 1 is maintained constant; however, according to the welding method of the invention, the weld torch (2) is oscillated in the up and down direction, and accordingly, the distance (L) is not constant but is varied.

Although an explanation will be given of the method of the invention by examples, in the following explanation it is assumed that the inside of the groove is filled by the deposited metal from the bottom portion of the groove up to a height of about 10 mm by one welding operation in a welding condition (assuming a weld heat input of up to 25 kJ/cm). In this case, a target of an upward and downward movement length of the distal end of the wire is at least 5 mm and at most 10 mm, and heat input distribution is provided in this range.

Figure 2:
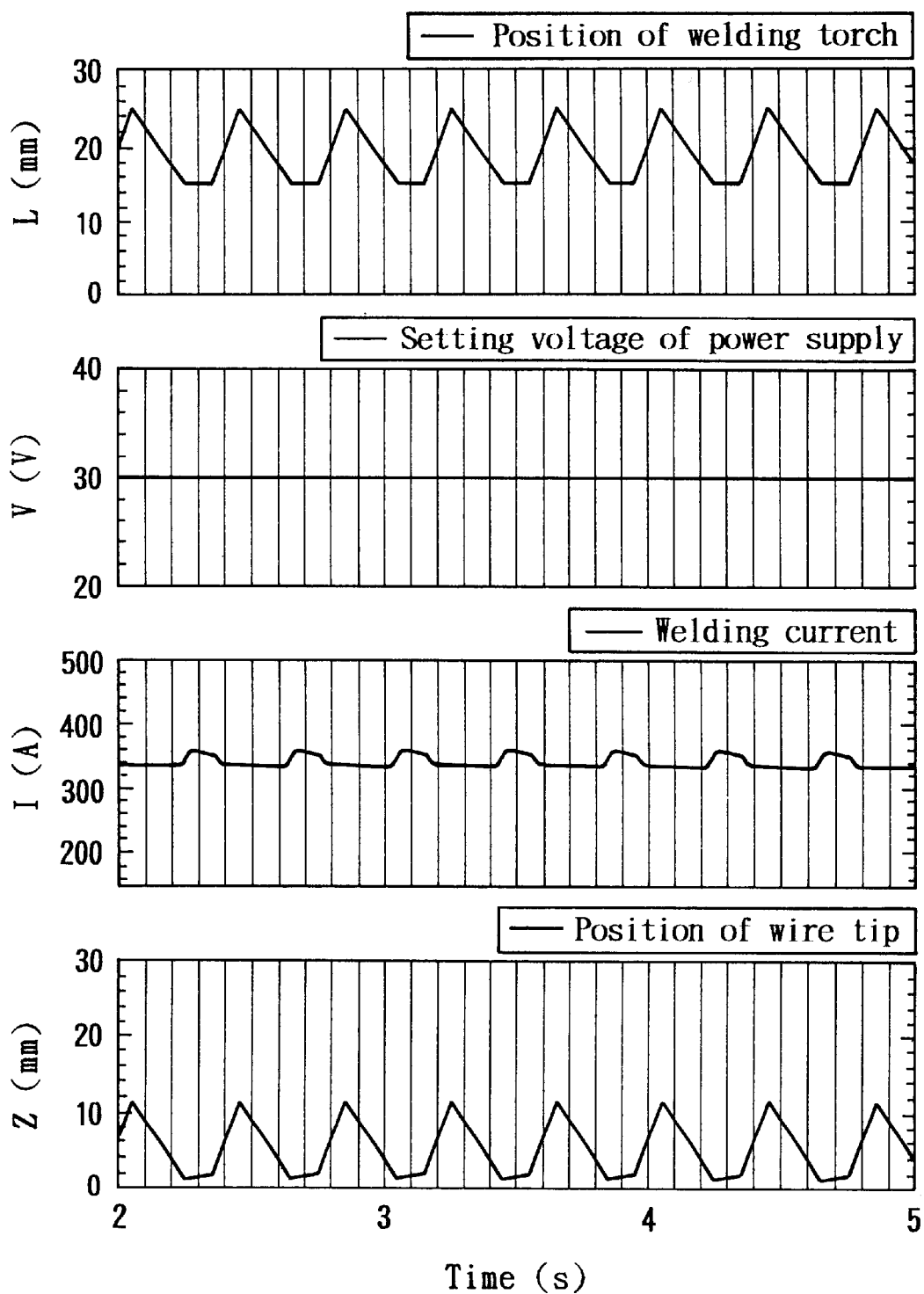
FIG. 2 illustrates diagrams in which a welding operation by oscillating a weld torch is shown as a change in behavior of a distal end of a wire when the voltage in the external characteristics of power source is kept constant.

First, FIG. 2 illustrates diagrams exemplifying operation of upward and downward movement of a weld torch when the voltage of external characteristics of a power source is constant and a weld current is substantially constant. It is known that the heat input can be increased by oscillating the weld torch even when the position of the distal end of the wire is disposed at the root portion of the groove, and the heat input distribution in the groove is controlled.

Figure 3:
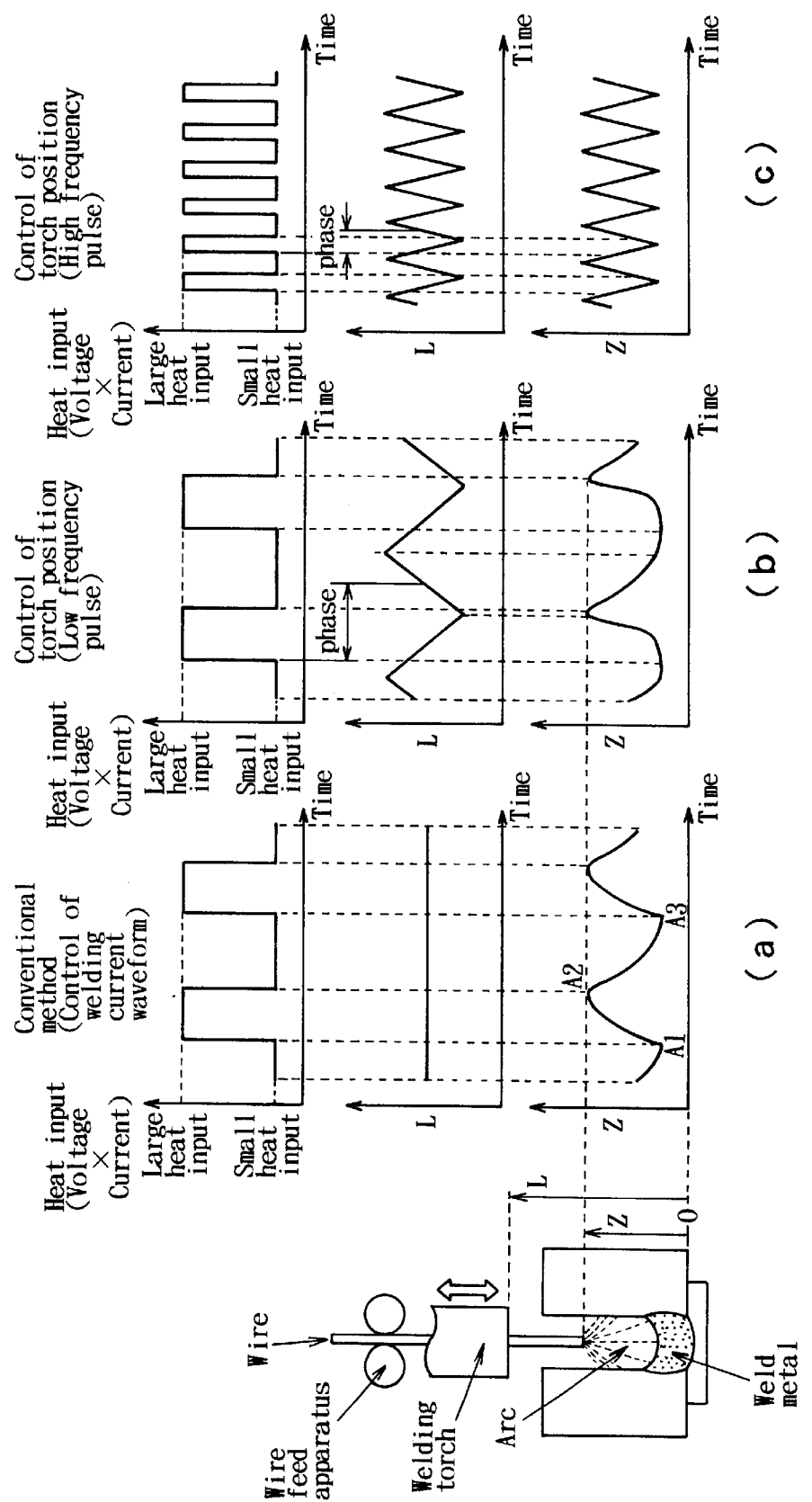
FIGS. 3a, 3b and 3c are diagrams showing changes in behavior of a distal end of a wire in a conventional method (FIG. 3a) and control of phases of oscillating a position of a weld torch and pulse current (FIGS. 3B, 3C)

Further, explaining the method of the invention when controlling a phase difference in comparison with conventional methods, for example, FIG. 3A exemplifies direct current pulse arc in the conventional method where the position of the weld torch (2) stays constant and in which a melting rate of the wire is increased upon supply of a large current and the distal end of the wire is changed from A1 to A2. When welding current is reduced after reaching A2, the melting rate of the wire is reduced and the distal end of the wire is changed to A3. However, at the bottom portion of the groove, current is reduced and accordingly, a heat input is relatively reduced and there is brought about a state in which not enough melting occurs at the bottom area of the groove.

In the meantime, according to direct current pulse welding while upwardly and downwardly oscillating the position of the weld torch as shown in FIG. 3B, exemplifying the method of the invention, in the case of low pulse frequency (about 10 Hz or lower), the position of the weld torch is not constant but can be oscillated. Further, by controlling a difference of a phase of the position of the weld torch when it is oscillated, also and controlling the phase of generating the pulse, the current can be increased when the distal end of the wire is disposed at the root portion of the groove. Thereby, melting at the root portion of the groove can easily be ensured.

In the case of pulse welding at a low frequency (about 10 Hz or lower), the position of generating arc at the distal end of the wire can be controlled by changing a characteristic of a power source, waveforms of current and voltage, polarity of the wire and so on, and when these various conditions are cooperatively varied in accordance with oscillation of the position of the weld torch, the heat input distribution can be controlled freely and effectively.

Meanwhile, in the case of pulse welding at a high frequency (about 10 Hz or higher), a melting rate of the wire by the pulse current is averaged and there results almost no variation of the arc generating point thereby. Thereby, the oscillation of the melted distal end of the wire becomes substantially equal to oscillation of the weld torch. Accordingly, the heat input distribution at the groove face of the base material can freely be controlled by setting a weld current waveform (heat input) by aligning a phase thereof to the phase of oscillating the weld torch.

FIG. 3c exemplifies the method of the invention when the pulse frequency is high (about 10 Hz or more), in which according to direct current pulse welding for upwardly and downwardly oscillating the position of the weld torch, the phase difference with respect to the oscillation of the torch position is arbitrarily set. Furthermore, the pulse waveform is arbitrarily set and an arbitrary heat input distribution is formed inside the groove while ensuring melting of the root portion of the groove.

Basically, by such a control, the heat input distribution in the groove can be made proper and controllability is promoted.

Hence, a further specific explanation will be given of the method of the invention for controlling the difference between the phase of varying the position of the weld torch and the phase of arc current when it is changed.

Figure 4:
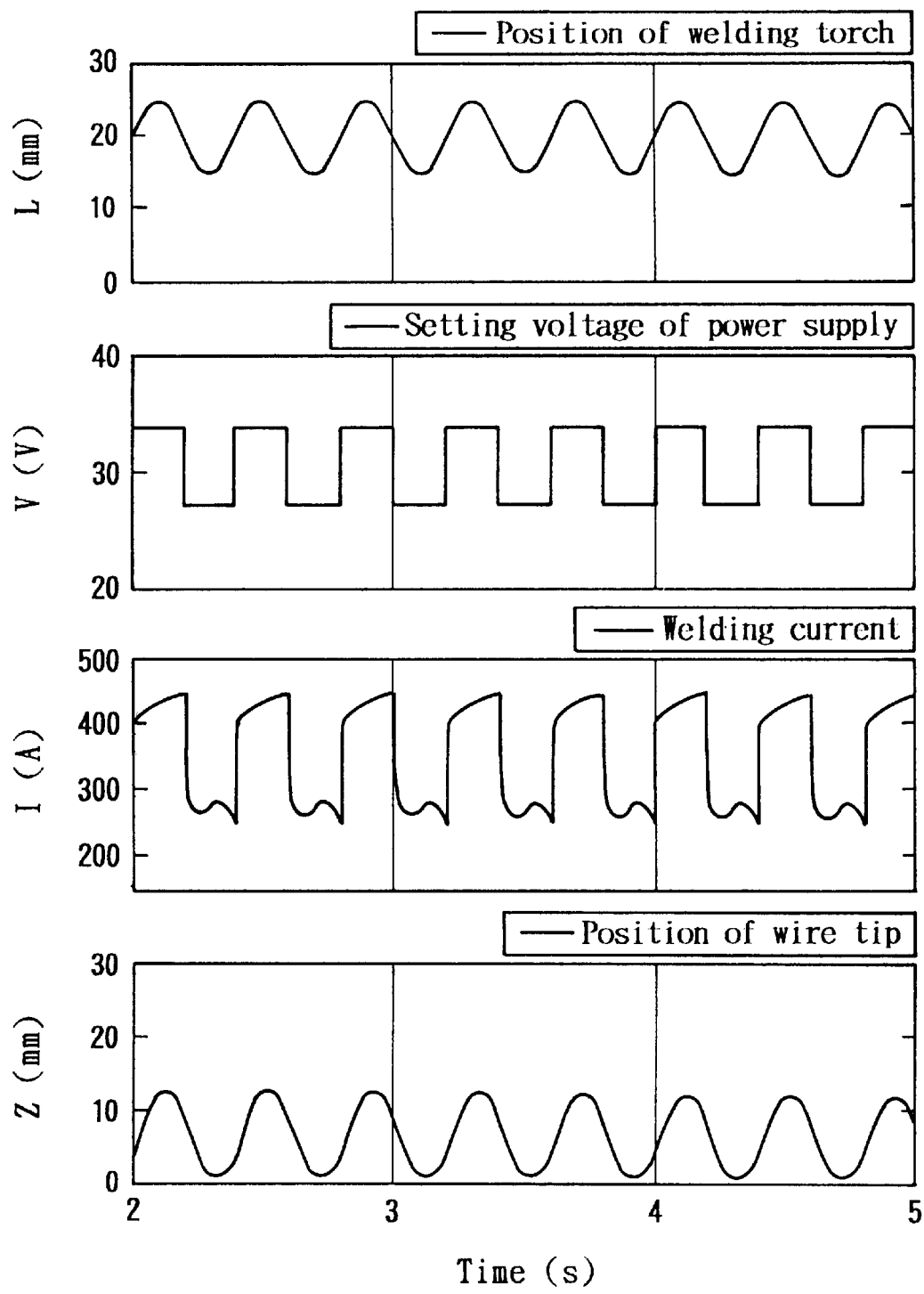
FIGS. 4, 5 and 6 are diagrams showing changes in behavior of a distal end of a wire when a phase difference is 0 (FIG. 4), −π/4 (FIG. 5) and −π/2 (FIG. 6)
Figure 5:
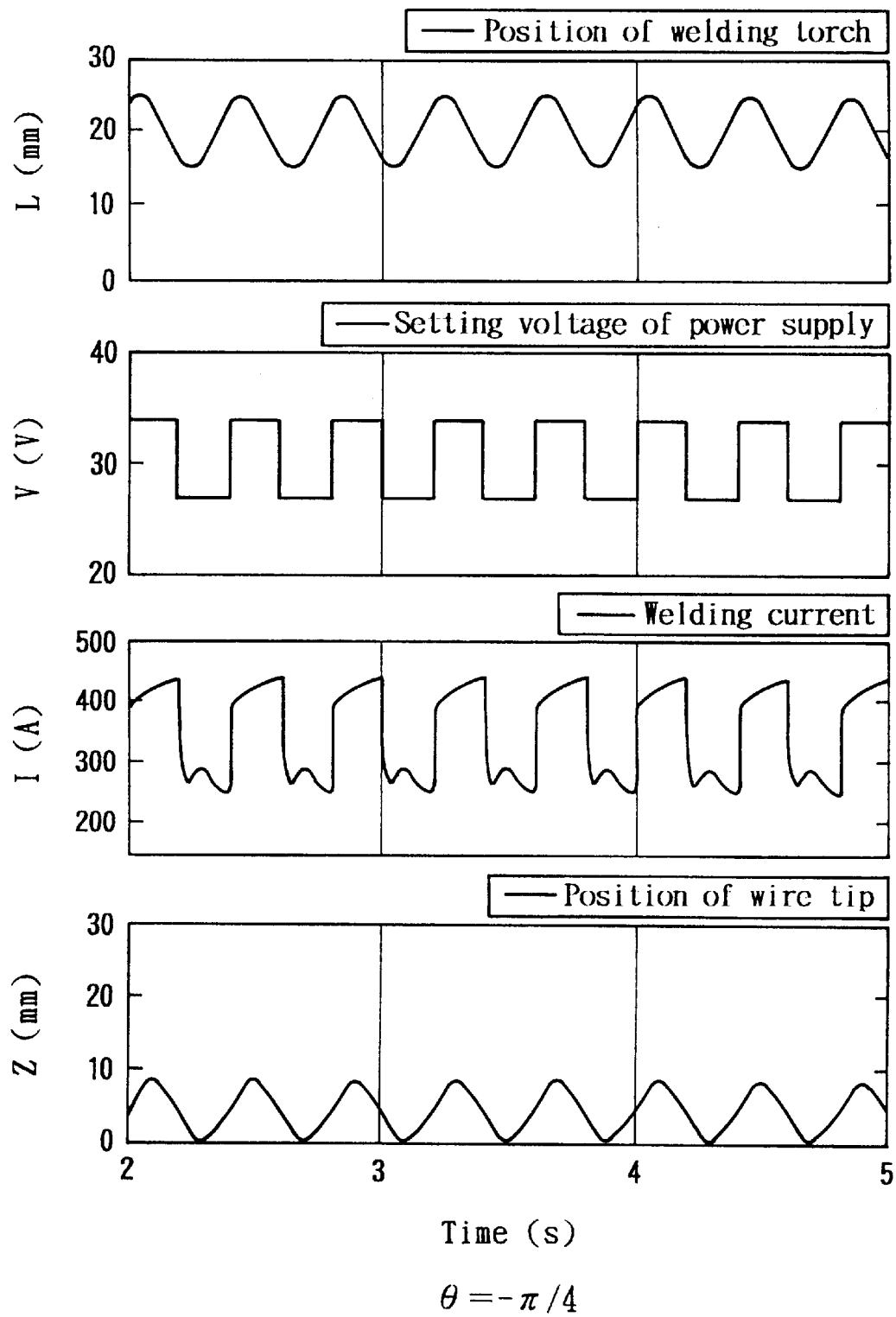
Figure 6:
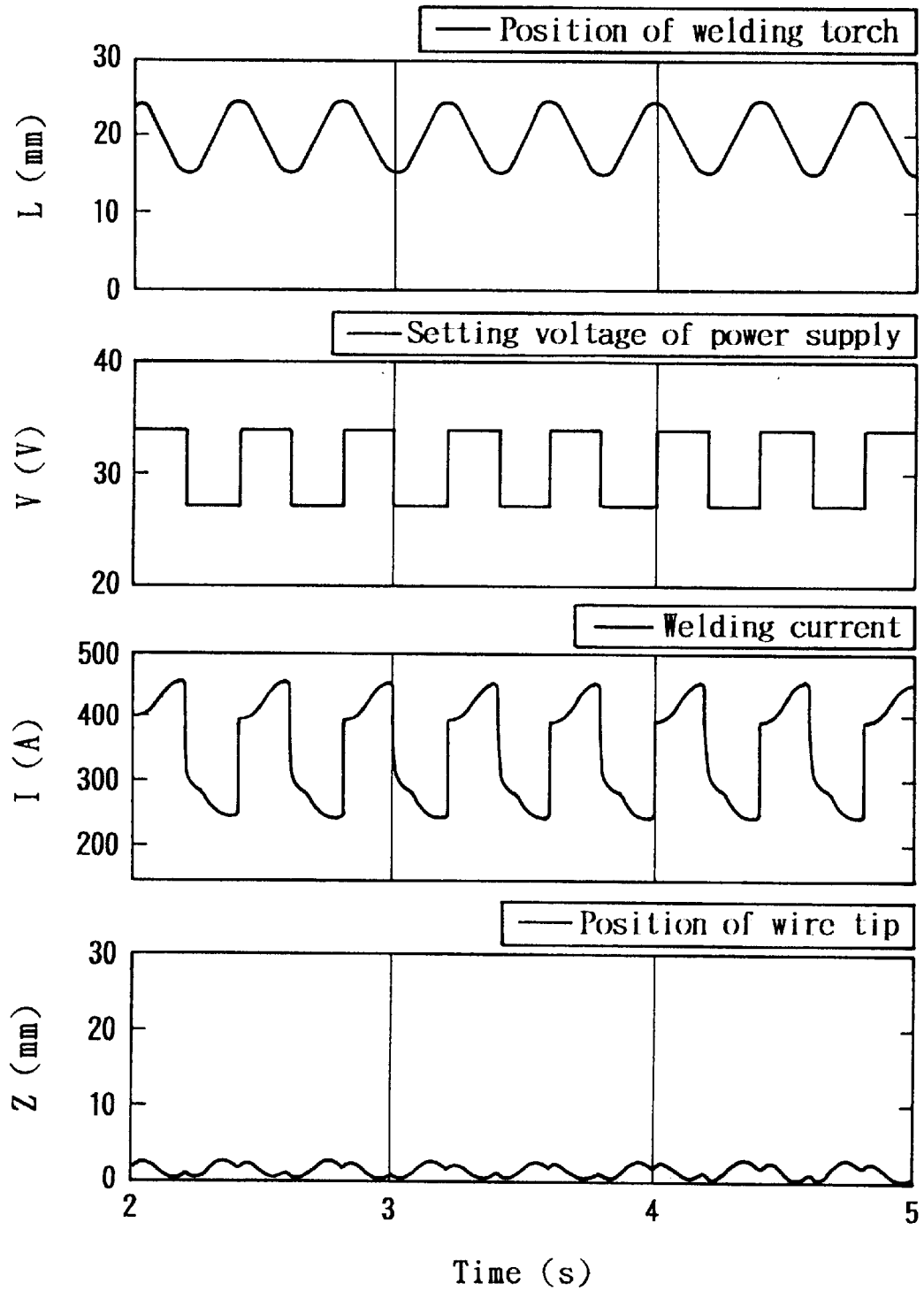
Figure 7:
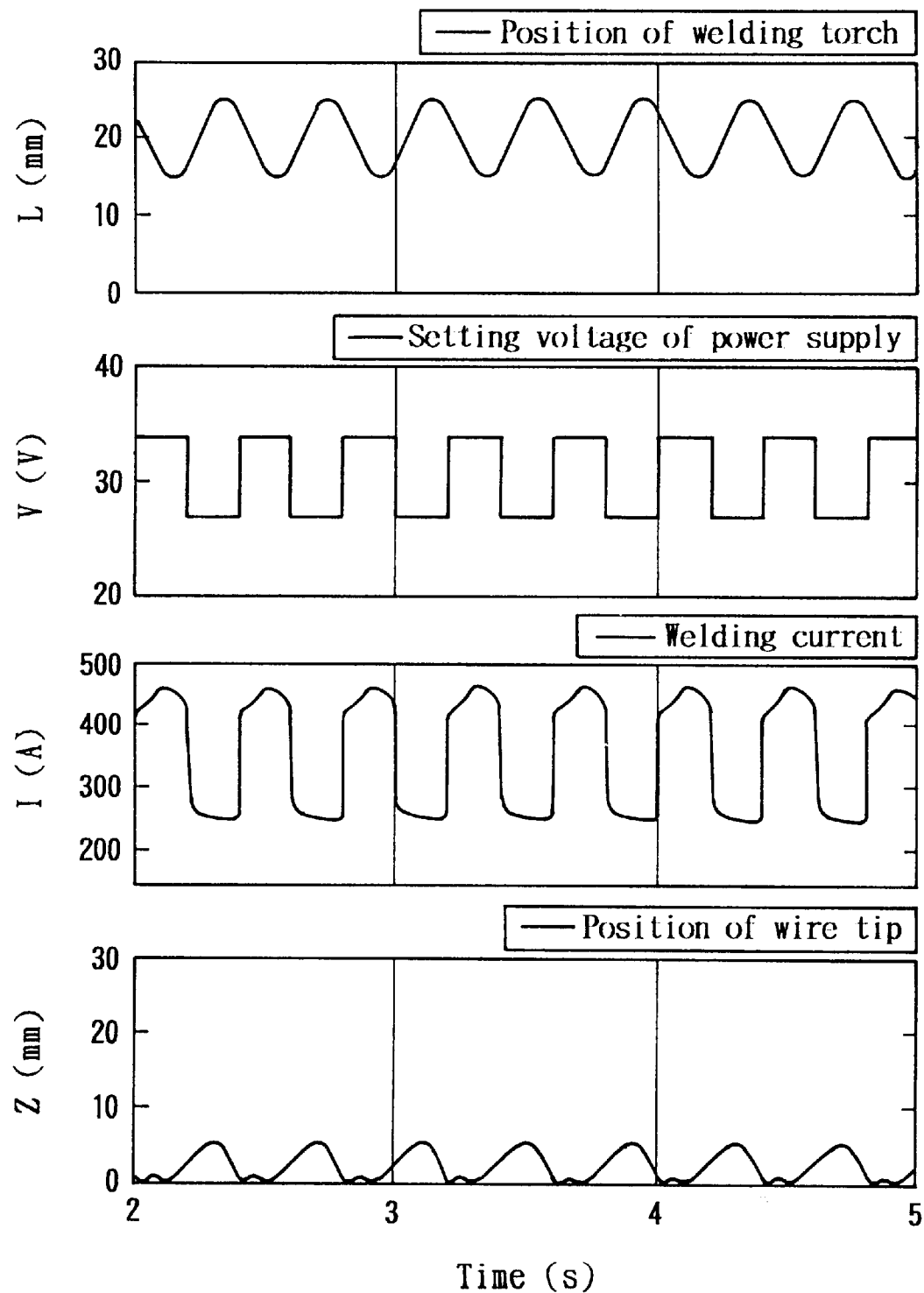
FIGS. 7, 8 and 9 are diagrams showing the behavior of the distal end of the wire when the phase difference is −3π/4 (FIG. 7), −π (FIG. 8) and −3π/2, π/2 (FIG. 9) similar to FIGS. 4, 5 and 6.
Figure 8:
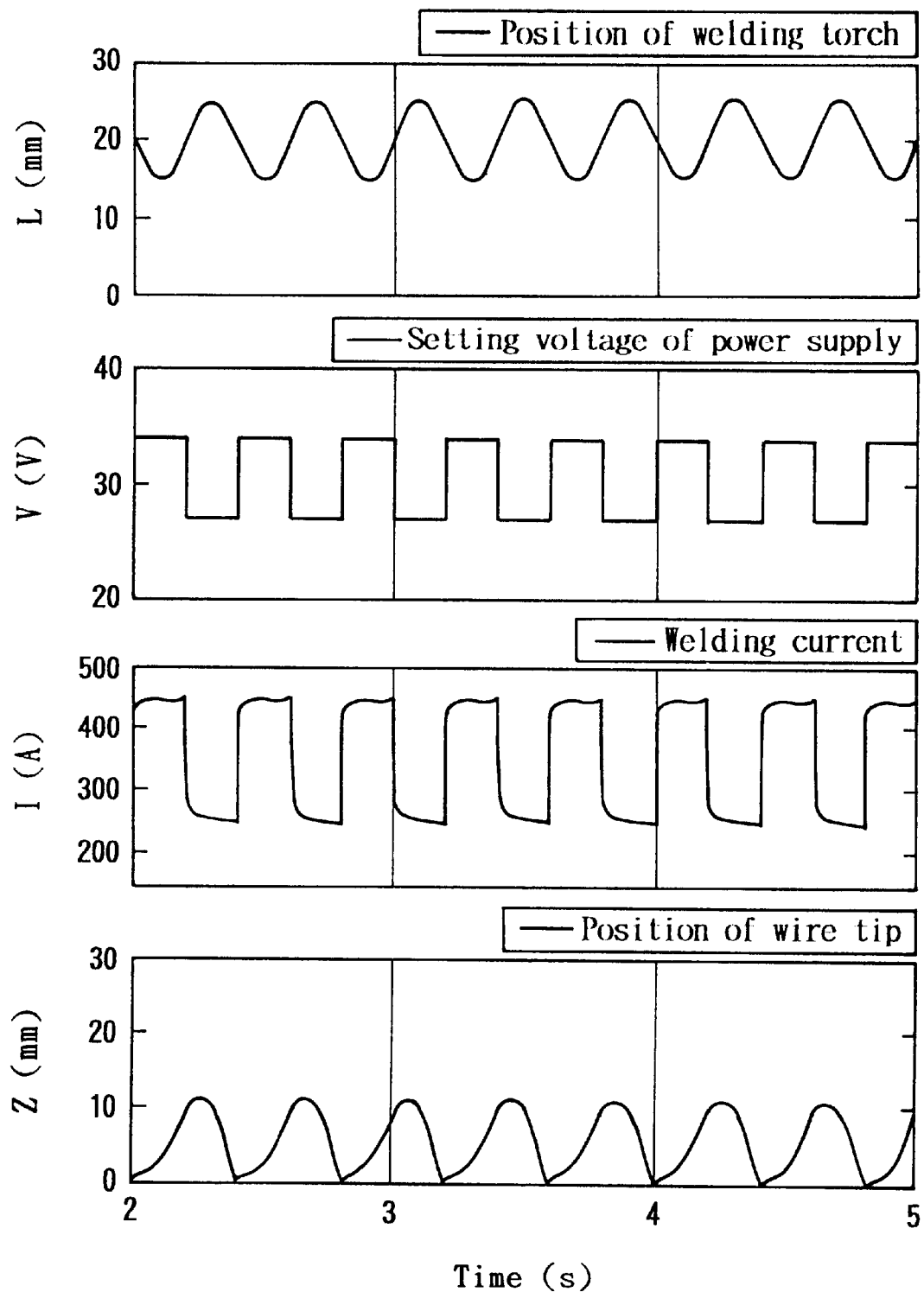
Figure 9:
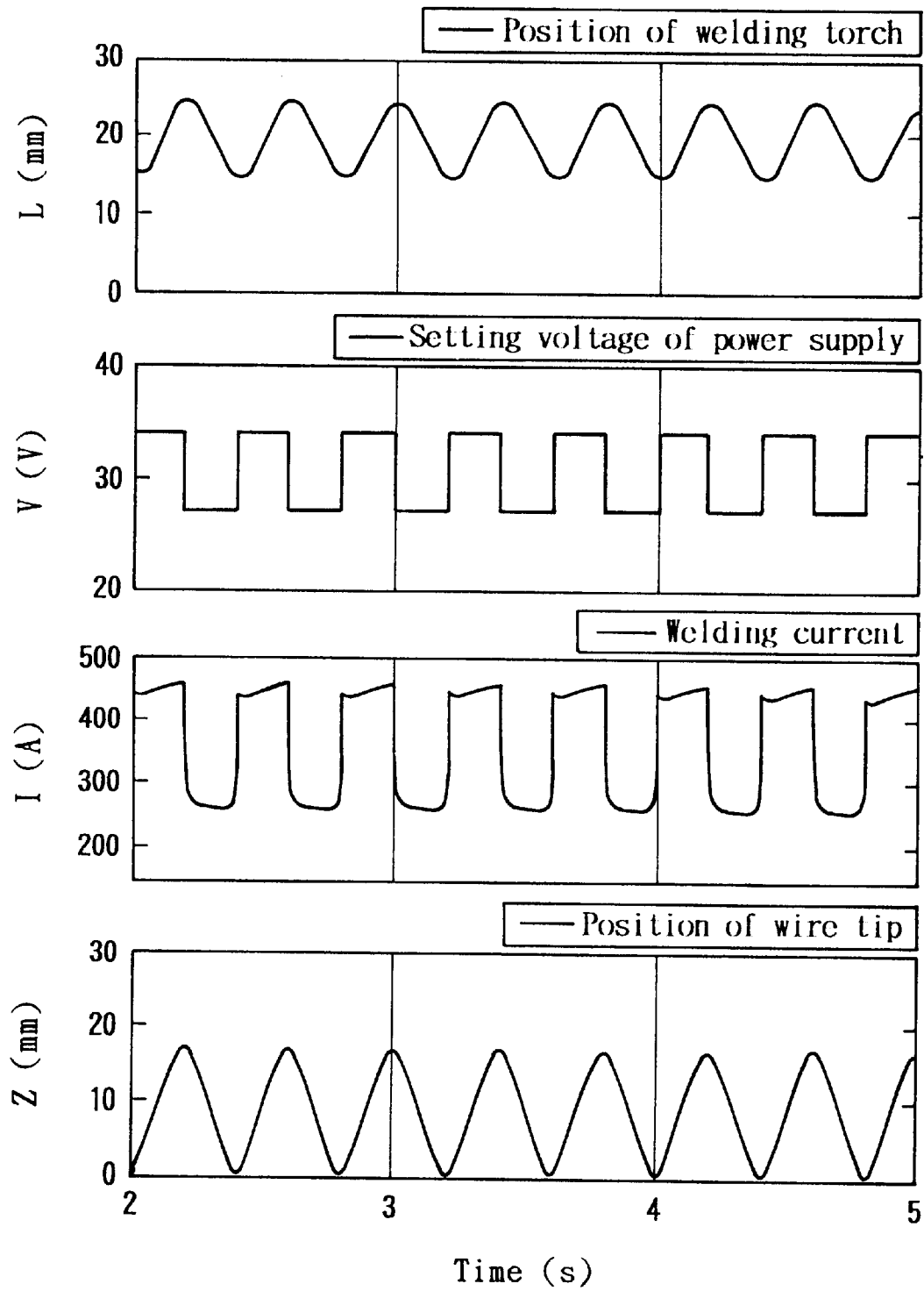

As shown by FIG. 3a, in a state where the position of the weld torch stays constant and the pulse current is applied, the distal end of generating arc (distal end of a wire) is brought into a state in which it changes from the root portion of the groove to an upper face thereof when the pulse current is being applied, and the pulse is not generated when the distal end of the wire is present at the root portion of the groove. Accordingly, sufficient heat is not inputted to the root portion of the groove. Hence, observe behavior of the distal end of the wire when a phase difference (0) in applying pulse current having a constant current waveform is changed with a reference of oscillation of the position of the weld torch at 2.5 Hz. Then, the pulse heat is not inputted to the bottom portion of the groove at phase difference of 0, pulse period of 0.4 seconds and weld torch oscillation period of 0.4 seconds as shown by FIG. 4. FIG. 5 shows a case in which only the phase difference is set to $-\pi/4$ under the same condition and also in this case, the heat is not effectively inputted to the bottom portion of the groove. In the case of FIG. 6 where the phase difference is set to $-\pi/2$, conversely to the above-described, a total of heat is inputted only to the root portion of the groove and the heat input distribution cannot be set in the plate thickness direction. In the case of the phase difference of $-3\pi/4$ in FIG. 7, the pulse heat is effectively inputted to the root portion of the groove and the heat density distribution can be set in the plate thickness direction. Further, also in the case of the phase difference of $-\pi$ of FIG. 8, the pulse heat is effectively inputted to the root portion of the groove. However, it is known that in the case of the phase difference of $-3\pi/2$ ($\pi/2$) of FIG. 9, the pulse heat cannot be effectively inputted to the root portion of the groove again.

For example, the control of the phase difference is optimized as described above (in this example, $-3\pi/4$ and $-\pi$) by which the pulse heat is effectively inputted to the root portion of the groove.

Figure 10:
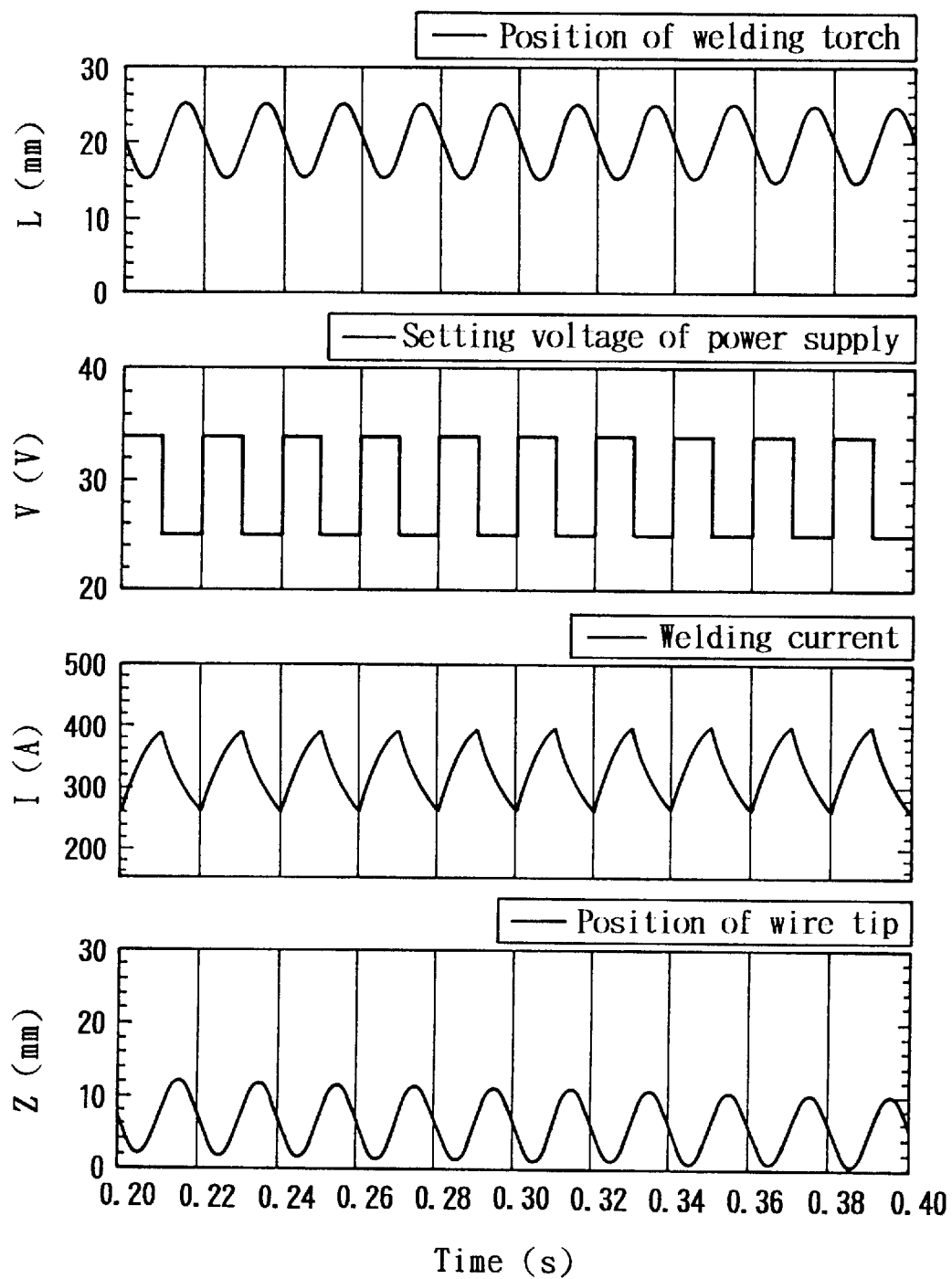
FIG. 10 is a diagram showing behavior of a distal end of a wire when a phase difference is π with an extremely short period.

Further, when the position of the weld torch is upwardly and downwardly oscillated mechanically, even at an extremely short period (about 10 Hz or more in frequency), the amplitude of the position of the torch in the up and down direction can be ensured. FIG. 10 shows a case in which the pulse current frequency and the frequency of oscillating the torch are set to 50 Hz. The wire melting rate by high frequency pulse current is averaged, the variation is almost nullified and the oscillation of the melted distal end of the wire constituting the point of generating arc becomes substantially the same as oscillation of the weld torch. Therefore, the phase difference of the oscillation of the weld torch is set as in FIG. 10 ($\theta=\pi$) and the weld current waveform (heat input) is arbitrarily set by which the heat input distribution at the groove face of the base material can freely be controlled.

Further, also in the case of alternating current welding, the heat input distribution similar to the above-described can be controlled by setting the wire polarity to positive or setting large current value when the distal end of wire is disposed at a region intended to increase input heat density. Further, according to the above-described control, a variation in a shape of melting can be controlled by high frequency oscillation.

Further, when the case of alternating arc is exemplified, the members to be welded can effectively be melted in the case in which the wire side exhibits positive polarity.

Figure 11:
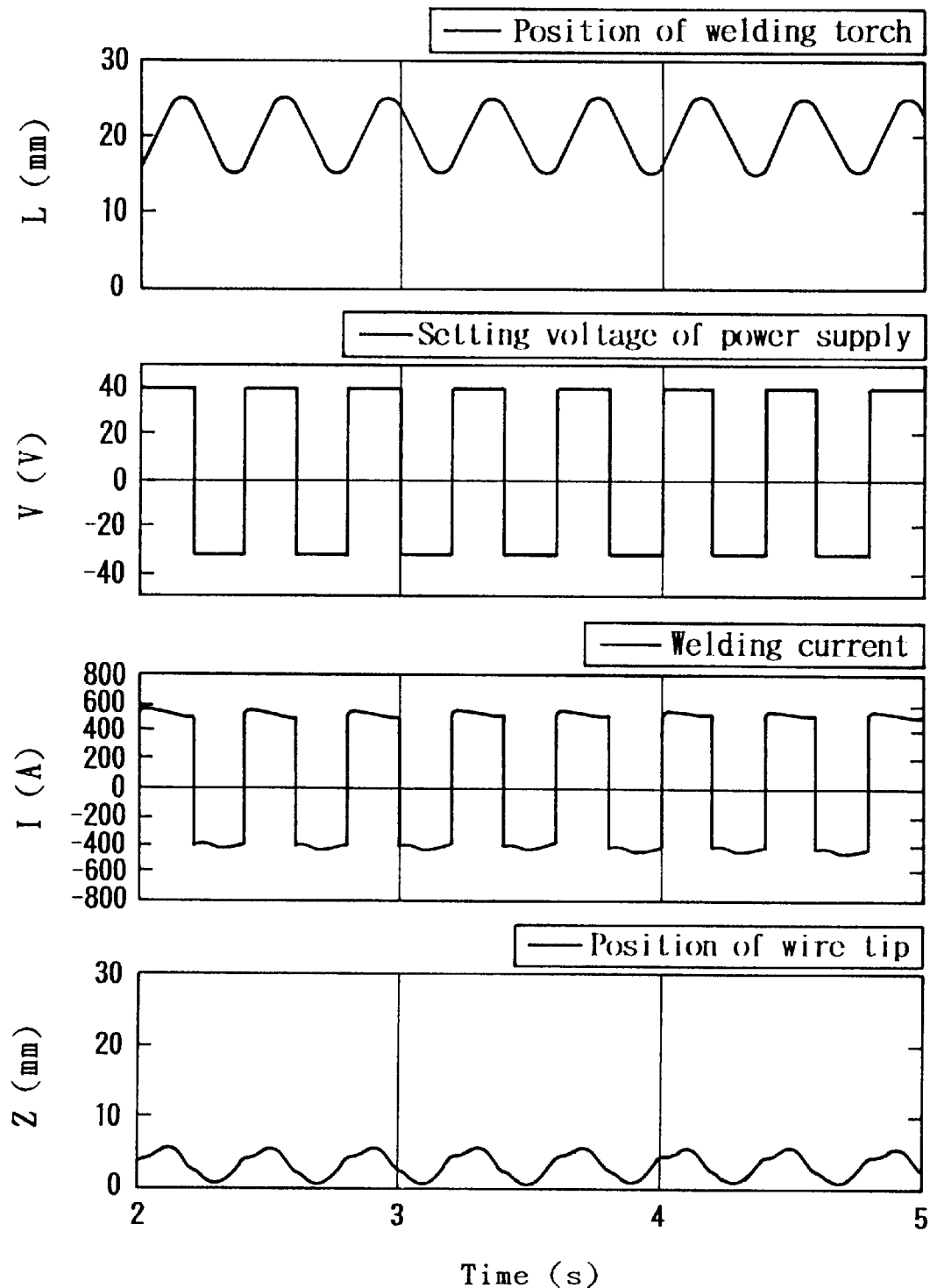
FIGS. 11, 12 and 13 are diagrams exemplifying alternate current welding.
Figure 12:
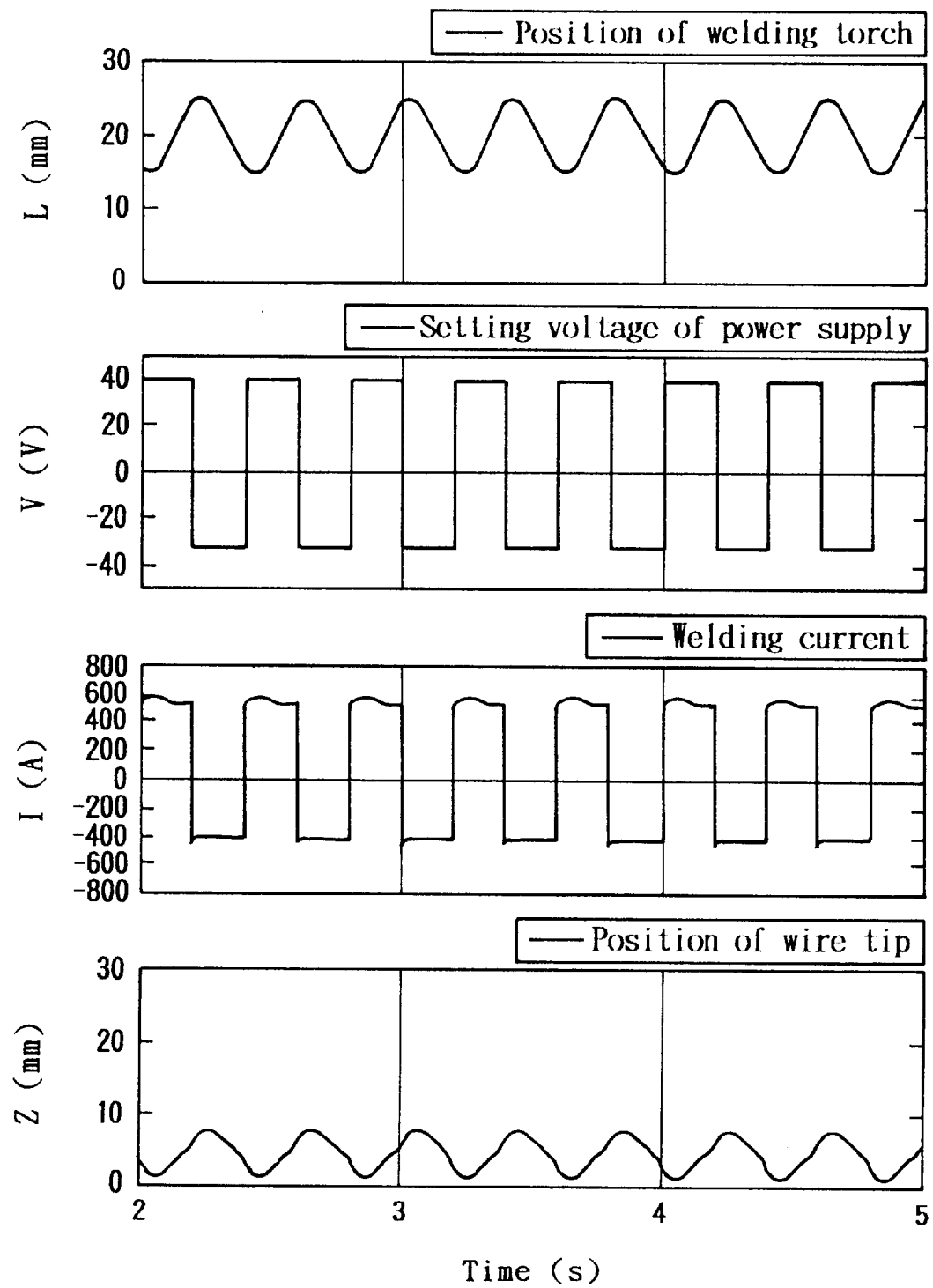
Figure 13:
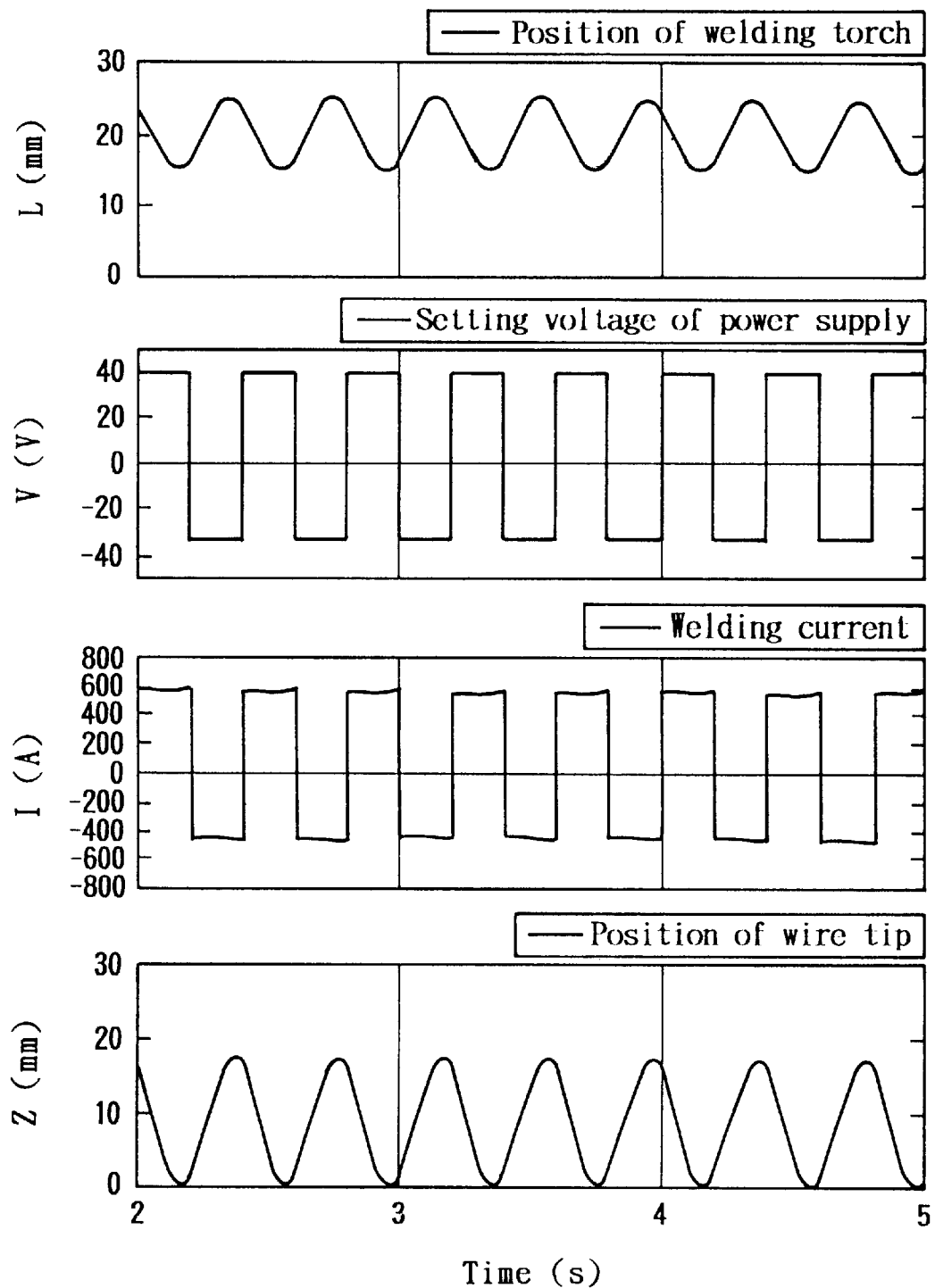

Further, when the wire exhibits negative polarity, compared with the positive polarity, the melting rate of the wire is increased and therefore, the position of the distal end of the wire is changed complicatedly depending on a relative relationship between behavior of oscillating the position of the torch and the variation of the melting rate of the wire. FIGS. 11, 12 and 13 show cases of the phase differences $\pi/4$ (FIG. 11), $5\pi/8$ (FIG. 12) and $5\pi/4$ (FIG. 13). The phase difference of $5\pi/8$ establishes a proper condition and when the distal end of the wire reaches the root portion of the groove, the wire side exhibits positive polarity (weld current is positive) and melting of the root portion of the groove can be ensured.

As described above, according to the invention, the heat input distribution at inside of the groove can freely be controlled, and thus there can be carried out a welding operation capable of ensuring melting of the root portion of the groove and smoothing a shape of a surface of a bead in a normal I, V or K type groove or in an ultra narrow gap groove having a groove width of 10 mm or smaller. Furthermore, there can be carried out welding operation of a structure preserving type in which excessively large weld heat is not generated and the characteristic of the base material is not deteriorated.

That is, according to the invention, there is provided a welding system capable of freely controlling dispersion and concentration of arc heat input at a groove face of base material. By controlling a heat input distribution of arc, melting of the base material can be ensured while restraining excessively large weld heat. At the same time, the heat density in welding can be reduced and therefore, there is expected a welding operation which does not deteriorate the mechanical properties of the base material.

Embodiment 2

Further, in FIG. 1, there can also be constituted a welding apparatus for the seventh through the eleventh aspects of the invention. In the apparatus of FIG. 1, there are provided the weld torch (2) connected to the weld power source (1) and the wire feed apparatus (7) for filler wire (3) as a consumable electrode via the weld torch (2). Furthermore, feed speed of the weld wire (3) can periodically be varied by the feed apparatus (7) and an arc heat point (a distal end of a wire) can be oscillated in the axial direction of the generated arc (5), that is, in the up and down direction of FIG. 1 in the groove between the members (4) for forming, for example, a narrow gap I-groove joint.

Although according to the conventional welding method, the feed speed of wire (3) is maintained constant, according to the welding method of the invention, the feed speed of the weld wire (3) is not constant but is periodically varied.

Further, numeral 6 in FIG. 1 designates a melted metal and notation Z designates a position of a distal end of a wire (the distance from the bottom portion of a groove).

Figure 14:
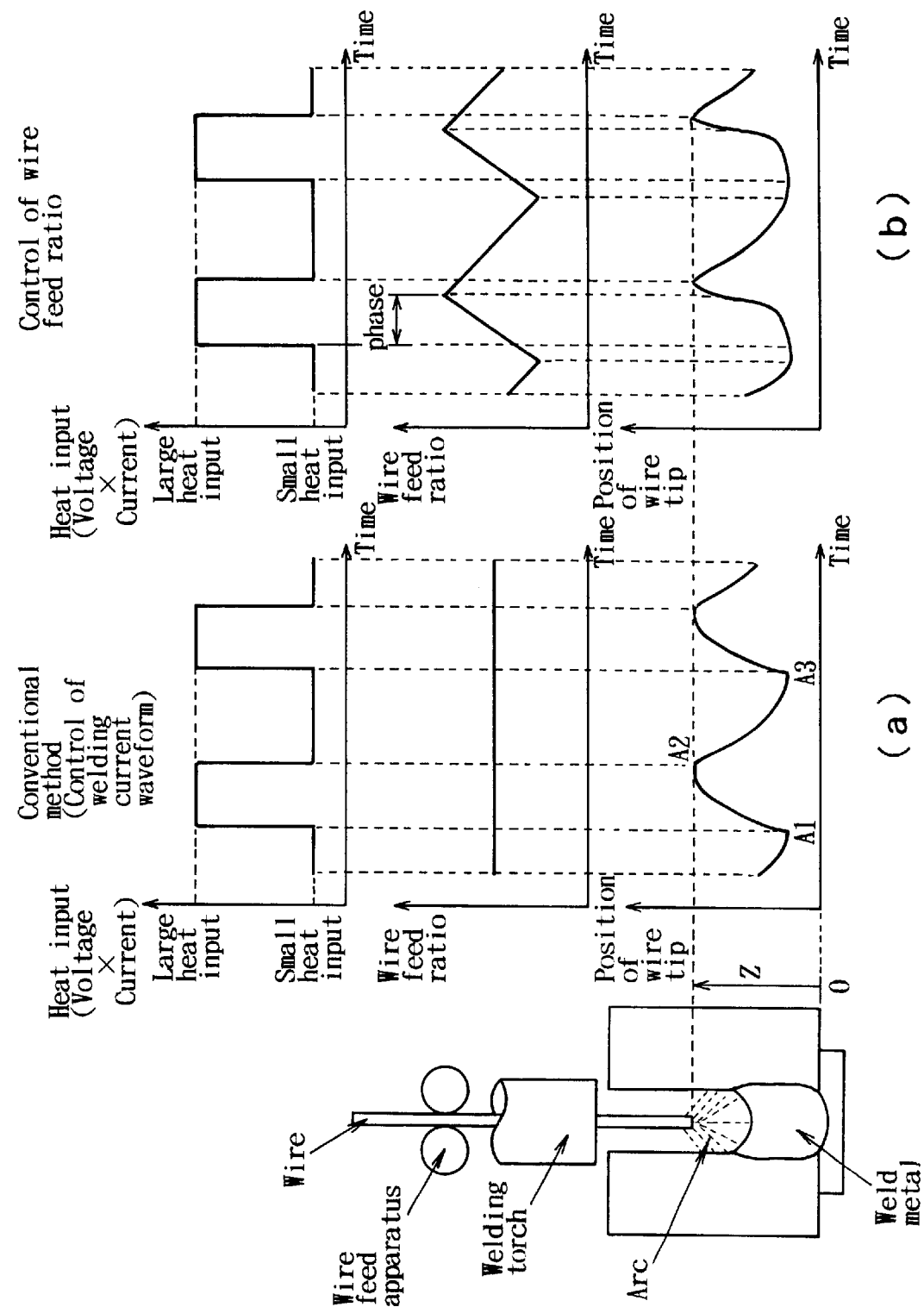
FIGS. 14a and 14b are diagrams showing changes in behavior of a distal end of a wire by a conventional method (FIG. 14a) and control of phases of a wire feed speed and pulse current (FIG. 14b)

Further, explaining the embodiment in comparison with the conventional method, for example, FIG. 14a exemplifies direct current pulse arc according to the conventional method where the wire feed speed stays constant in which the wire melting rate is increased in the case of large current and the distal end of the wire is changed from A1 to A2. When the current is lowered after reaching A2, the melting rate of wire is reduced and the distal end of the wire is changed to A3. However, the heat input is relatively reduced at the root portion of the groove since the arc current is reduced and there is brought about the state which is not suitable for ensuring melting of the root portion.

Meanwhile, according to direct current pulse welding for increasing and decreasing the feed speed of the weld wire in FIG. 14b and exemplifying the method of the invention, by controlling a difference of a phase of a periodical change of the wire feeding rate and a phase of generating pulses, high current can be constituted when the distal end of the wire is disposed at the root portion of the groove. Thereby, melting of the root portion of the groove can easily be ensured.

Although the position of generating arc at the distal end of the wire in the groove of welded material can be controlled by changes of characteristics of the power source, current and voltage waveforms of weld arc and polarity of the wire, when these various conditions are set cooperatively to the wire feeding rate, the heat input distribution can be controlled freely and effectively.

Furthermore, melting of welding members as the base material at the root portion of the groove can be ensured by optimally controlling the difference between the phase of the wire feeding rate and the phase of the characteristic of the current when it is changed.

In the optimizing operation, it is considered that an optimal phase difference differs by setting a variation period (frequency) of the wire feeding rate and the current characteristic, for example, a variation period (frequency) of DC pulse current.

Hence, in respect of how to consider these periods (frequencies), for example, the following example can be referred to.

Figure 15:
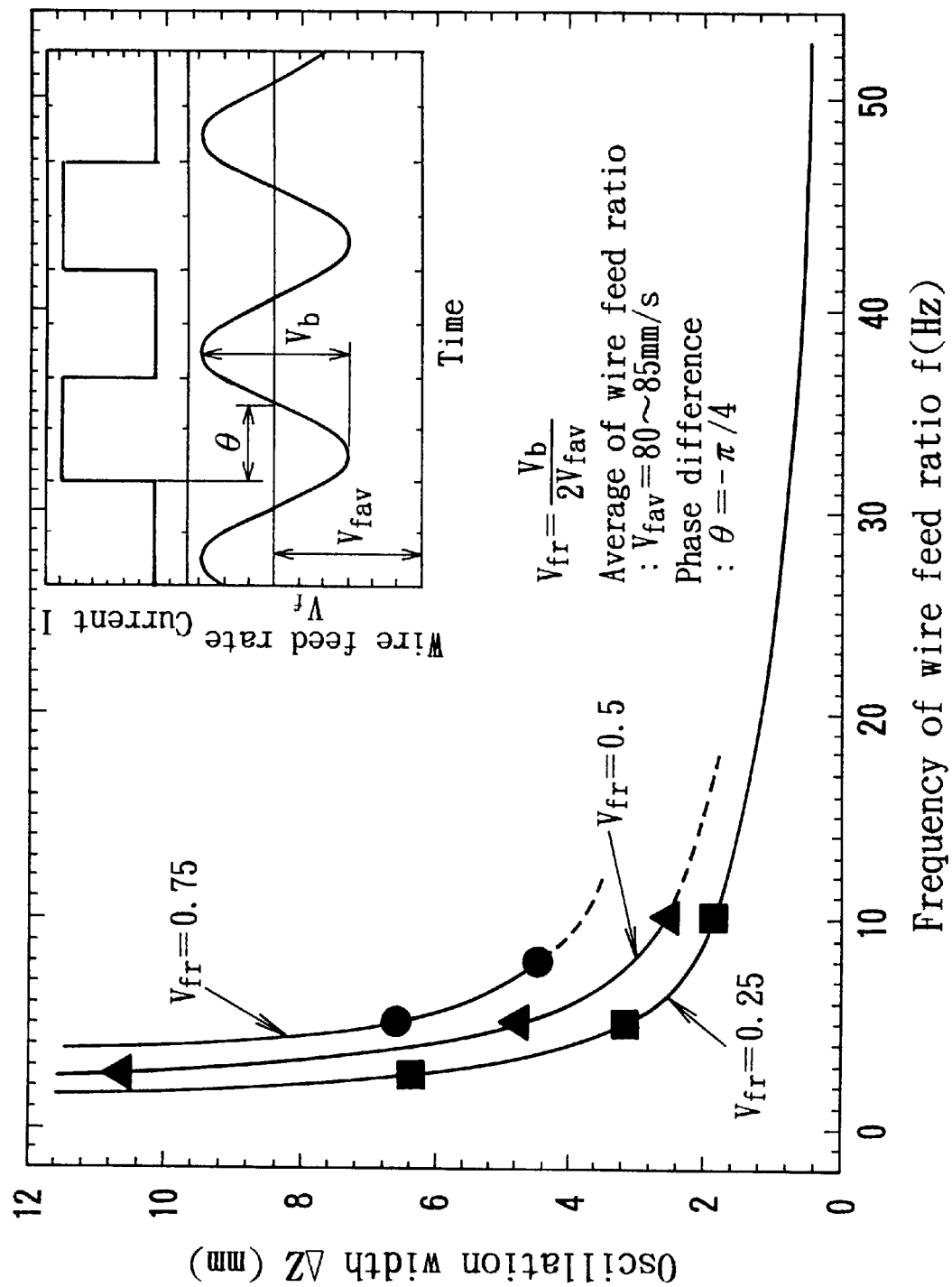
FIG. 15 is a diagram exemplifying a relationship between a frequency of a wire feed speed and a width of oscillating a wire in the up and down direction.

That is, firstly, in the case in which a rate ($V_{fr}$) of a variation ($V_b$) of the periodic wire feed speed to an average wire feed speed ($V_{fav}$), stays constant, when the variation frequency is increased, the upward and downward oscillation width ($\Delta Z$) of the distal end of the wire is rapidly reduced and the effect of the heat input distribution control cannot be achieved. For example, FIG. 15 exemplifies a relationship between a wire feeding rate variation frequency (f) and a wire distal end oscillation amplitude ($\Delta Z$) at the phase difference of $-\pi/4$ in the case of DC pulse current, and it is known that in the case of $V_{fr}$ being 0.25 through 0.75, when the frequency of wire feeding rate (f) is increased to 10 Hz, the upward and downward oscillation width ($\Delta Z$) of the distal end of the wire is rapidly reduced and is averaged to a minimum level at 10 Hz or higher.

Hence, when the inside of the groove is filled with a deposited metal from the root portion of the groove up to a height of about 10 mm by one welding operation in the welding condition assuming, for example, a heat input of up to 25 kJ/cm, it is considered that an upward and downward variation length of the distal end of the wire is provided with a target of at least 5 mm and at most 10 mm. Then, according to FIG. 9, it is preferable that variation frequency (f) of the wire feeding rate is 10 Hz or lower as a measure.

Further, also in respect of the pulse current, when the pulse frequency is increased, the wire melting rate is controlled by averaged current and the oscillation effect of the distal end of the wire with the pulse current cannot be expected. Further, for example, considering the above-described welding condition and the upward and downward variation length of the distal end of the wire, it is preferable that the frequency of the pulse of the current at 10 Hz or lower is set as a measure.

Hence, a further specific exemplification and explanation will be given of the method of the invention for controlling a difference between a phase of the feeding rate of the weld wire and a phase of the arc current characteristic when it is changed.

Figure 16:
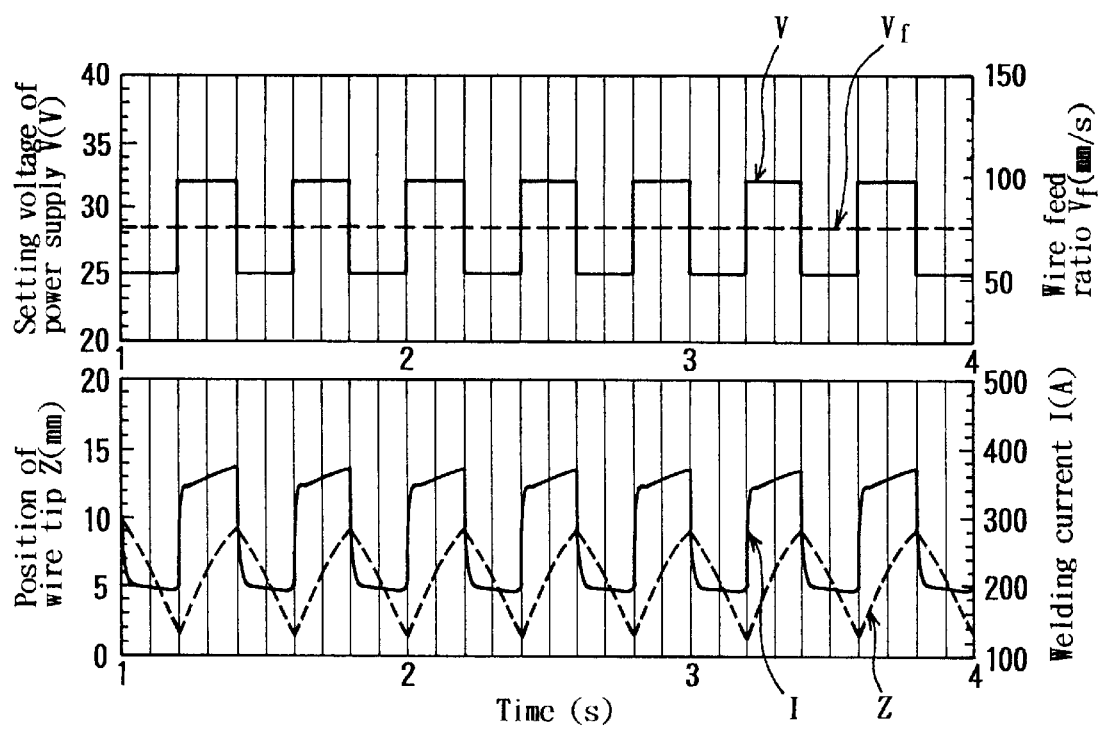
FIG. 16 illustrates diagrams showing a change in behavior of a distal end of a wire in the case of a conventional method where a wire feed speed is constant as a specific example.

First, FIG. 16 exemplifies the weld current and the position of the distal end of the wire when a period of pulse voltage is set to 0.4 seconds in the conventional welding method where the wire feeding rate is made constant, in which when the pulse current is applied, the arc generating end (distal end of wire) is rapidly moved upwardly from the root portion of the groove and sufficient heat cannot be provided to the root portion of the groove.

Figure 17:
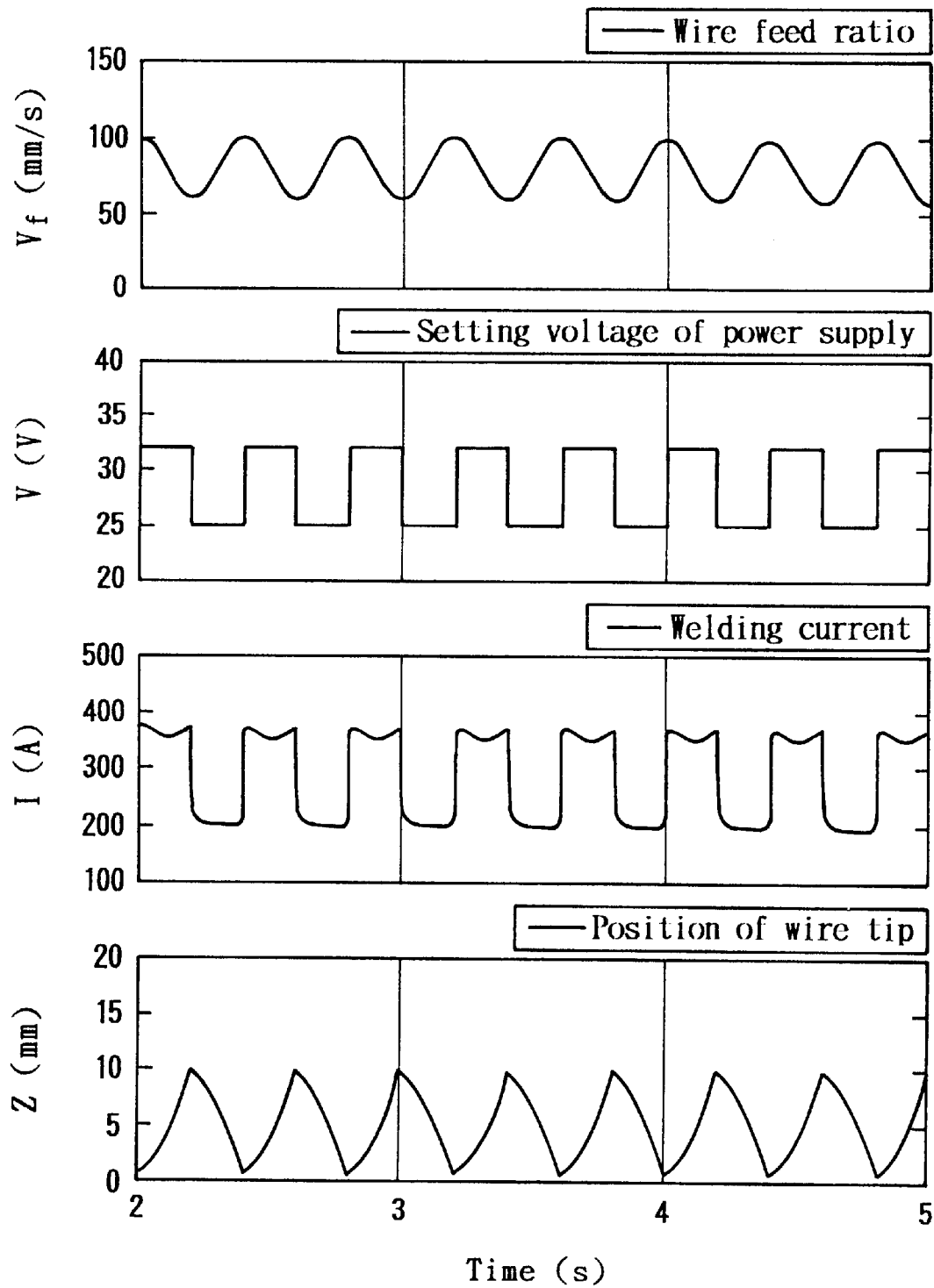
FIGS. 17, 18 and 19 are diagrams showing changes in behavior of a distal end of a wire according to an embodiment.
Figure 18:
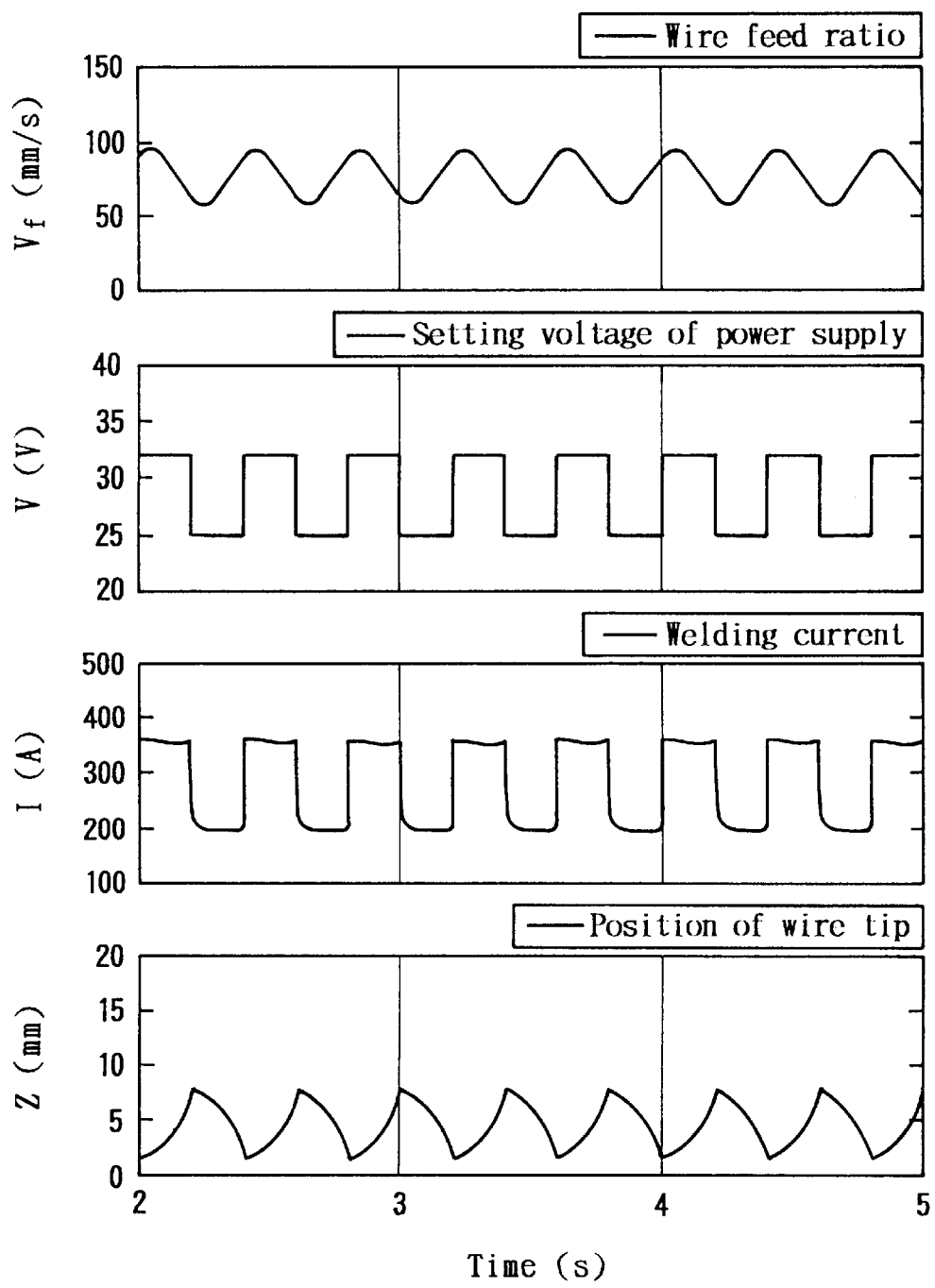
Figure 19:
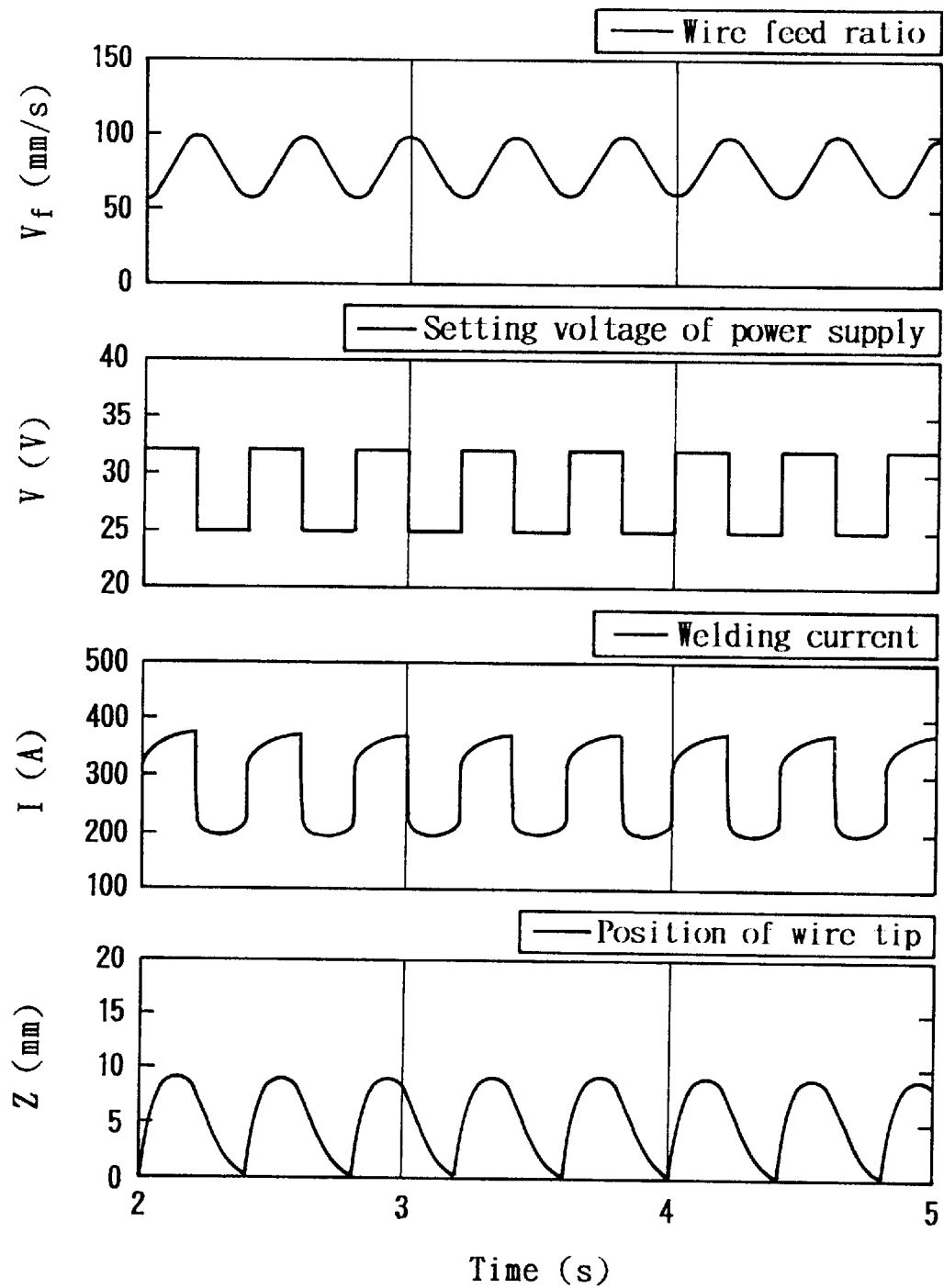

Meanwhile, FIGS. 17, 18 and 19 exemplify a relationship between the arc generating end (distal end of wire) and pulse current when the period of the pulse voltage is set to 0.4 seconds and the variation period of the wire feeding rate is also set to 0.4 seconds. A phase difference of $-\pi/4$ constitutes a proper condition and when the pulse current is applied, the distal end of the wire is present at the root portion of the groove. Furthermore, thereafter, the distal end of the wire is moved upwardly most gradually and in comparison with the conventional method of FIGS. 4, 5 and 6, heat can be inputted to the root portion of the groove.

Figure 20:
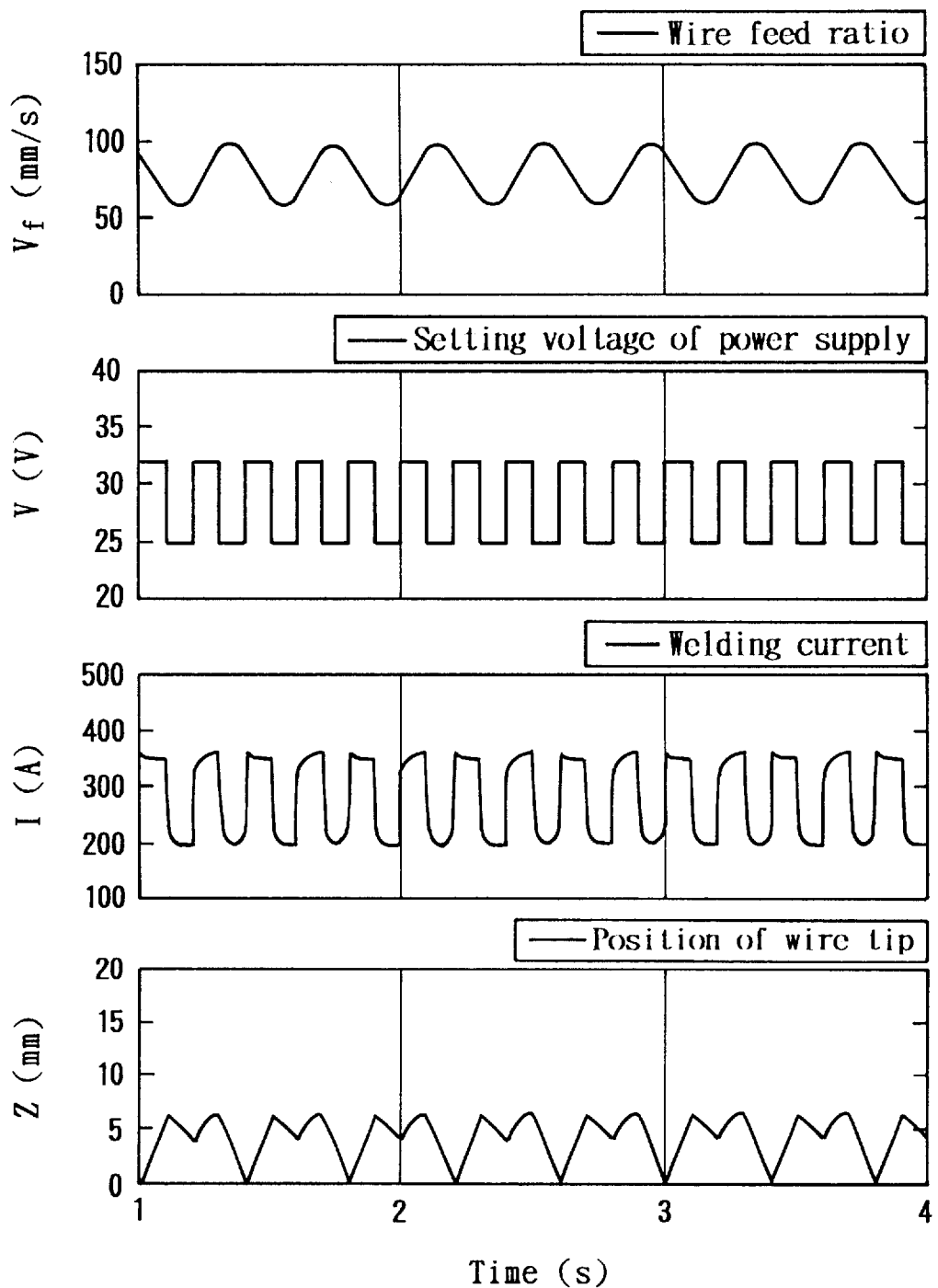
FIGS. 20, 21 and 22 are diagrams showing behavior of a distal end of a wire according to another embodiment.
Figure 21:
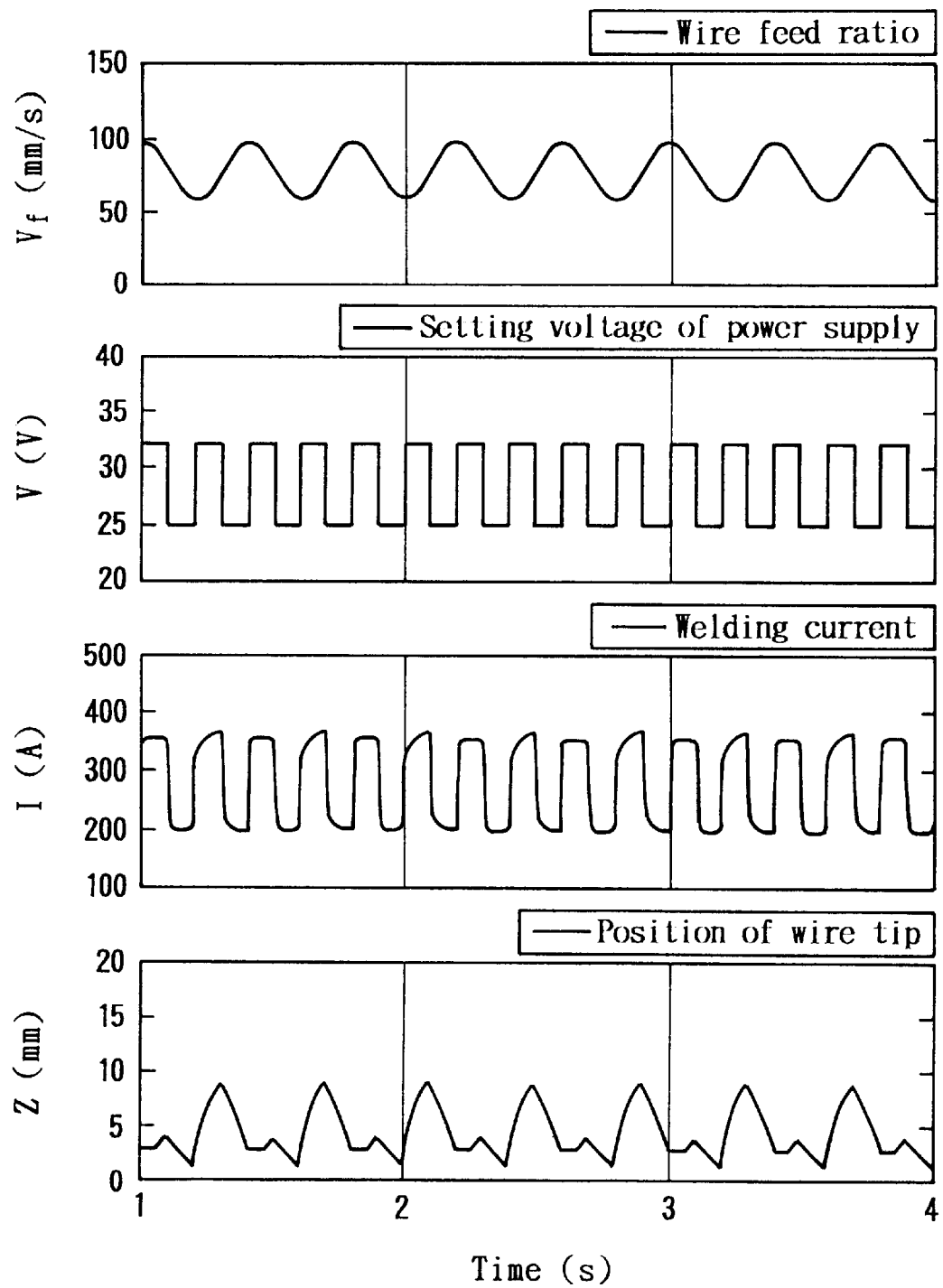
Figure 22:
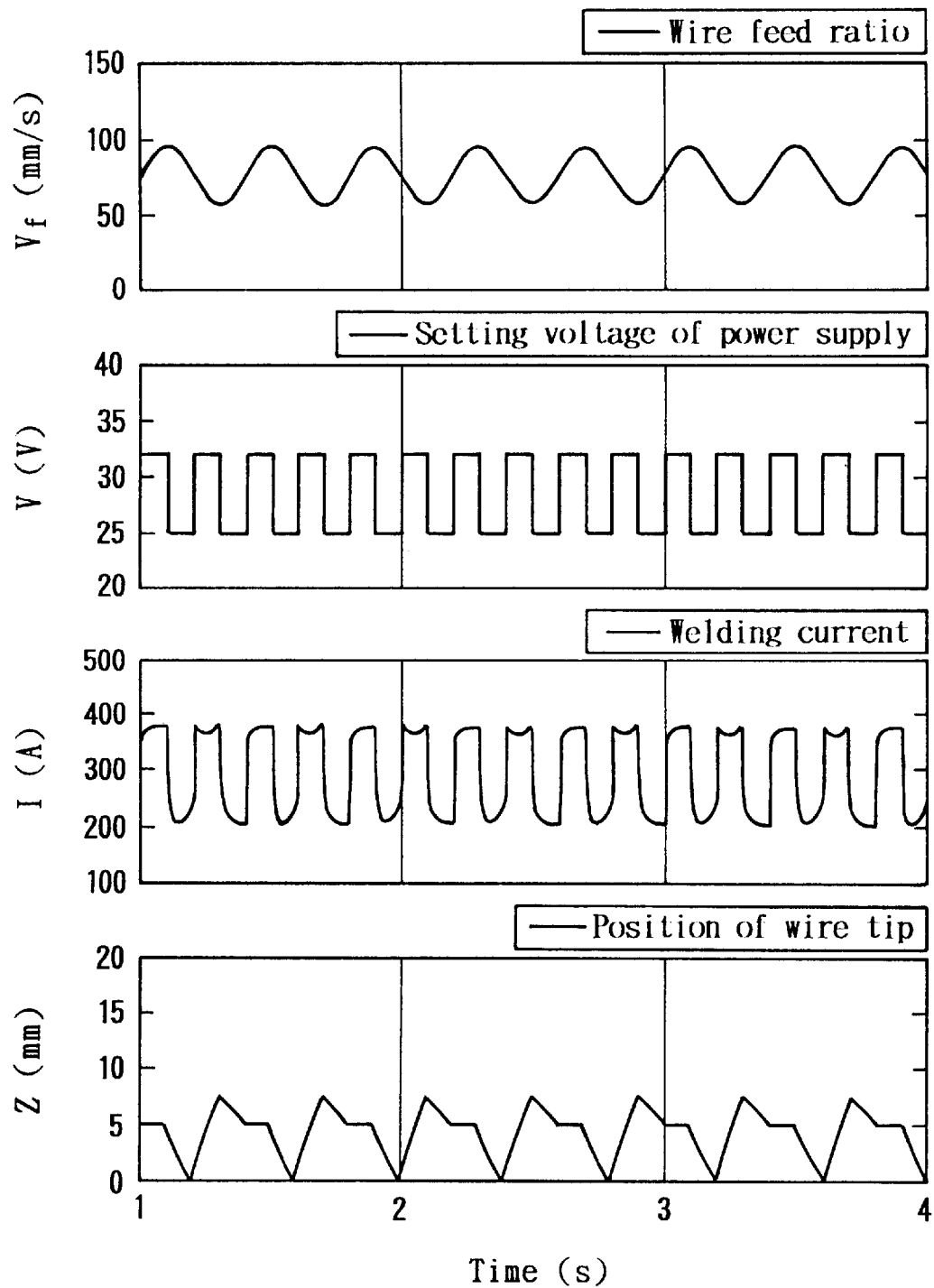

Further, FIGS. 20, 21 and 22 exemplify the case in which the period of the pulse voltage is set to 0.2 seconds and the variation period of the wire feed speed is set to 0.4 seconds, that is, the case in which 2 pulses are formed during 1 period of the feeding rate variation. It is known that in the case of the phase difference of $\pi/2$, the distal end of the wire stays at a vicinity of the root portion of the groove and at that time, power of 1 pulse is effectively inputted.

Figure 23:
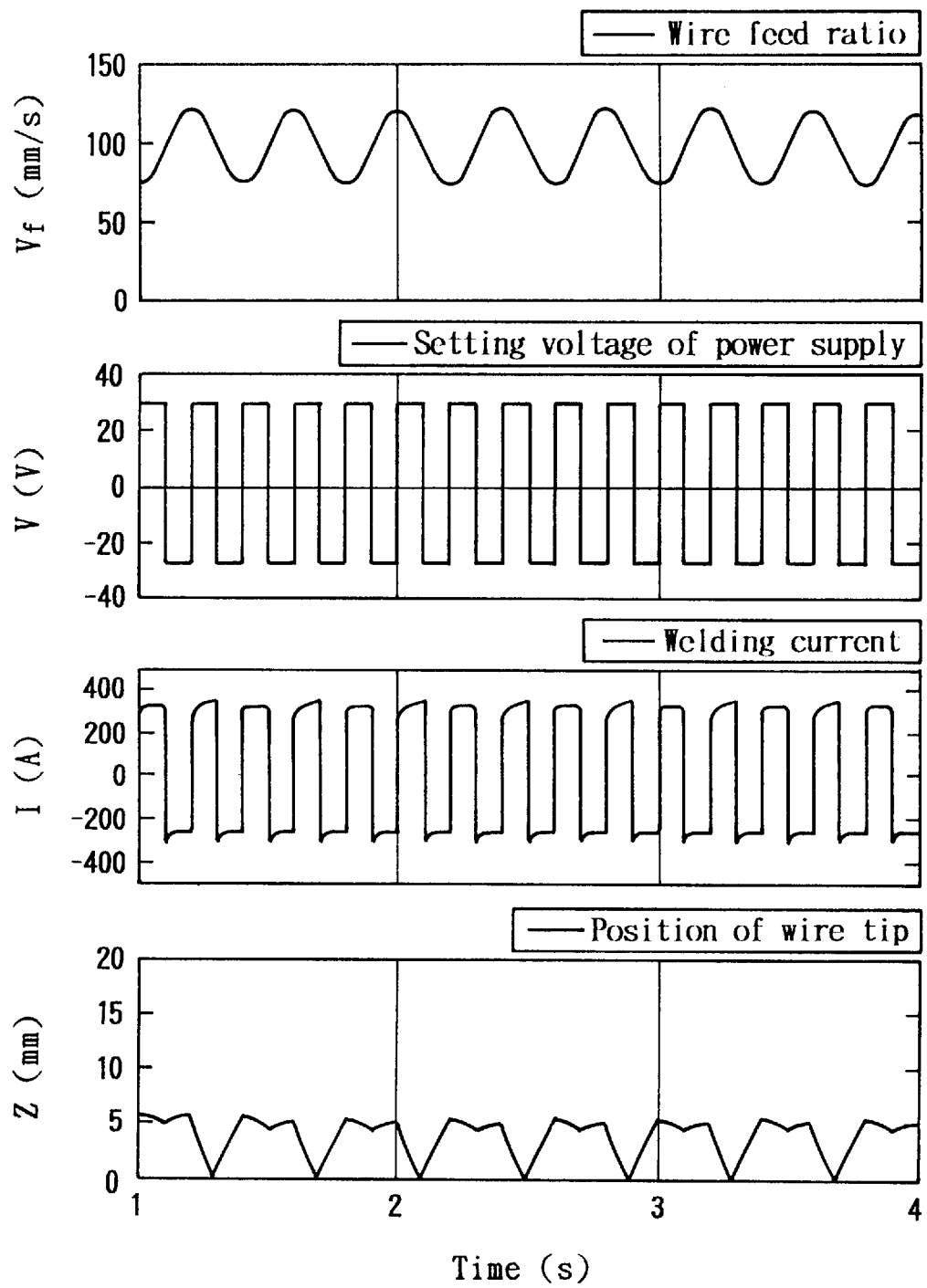
FIGS. 23, 24 and 25 are diagrams showing behavior of a distal end of a wire in alternating current arc welding according to yet another embodiment.
Figure 24:
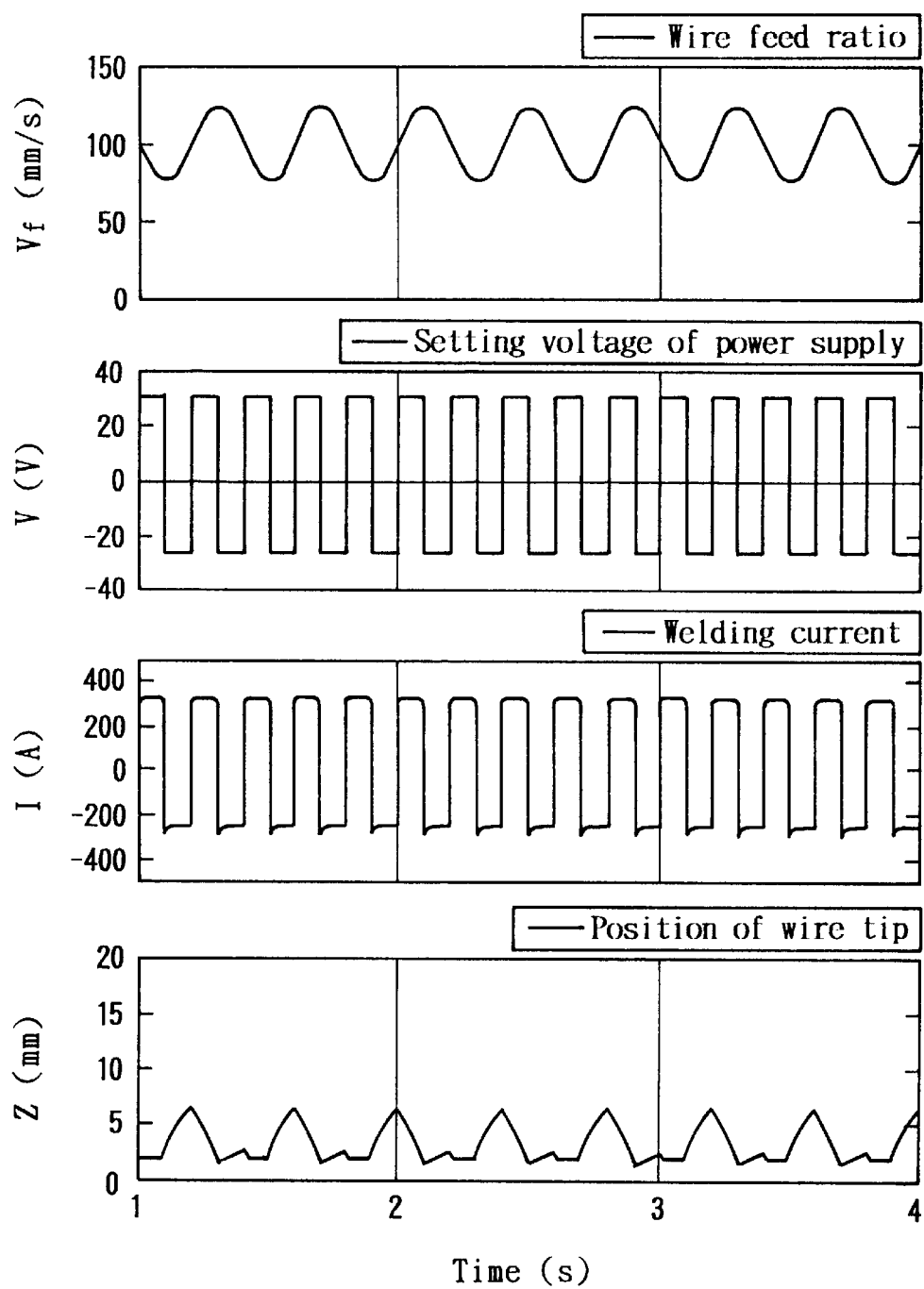
Figure 25:
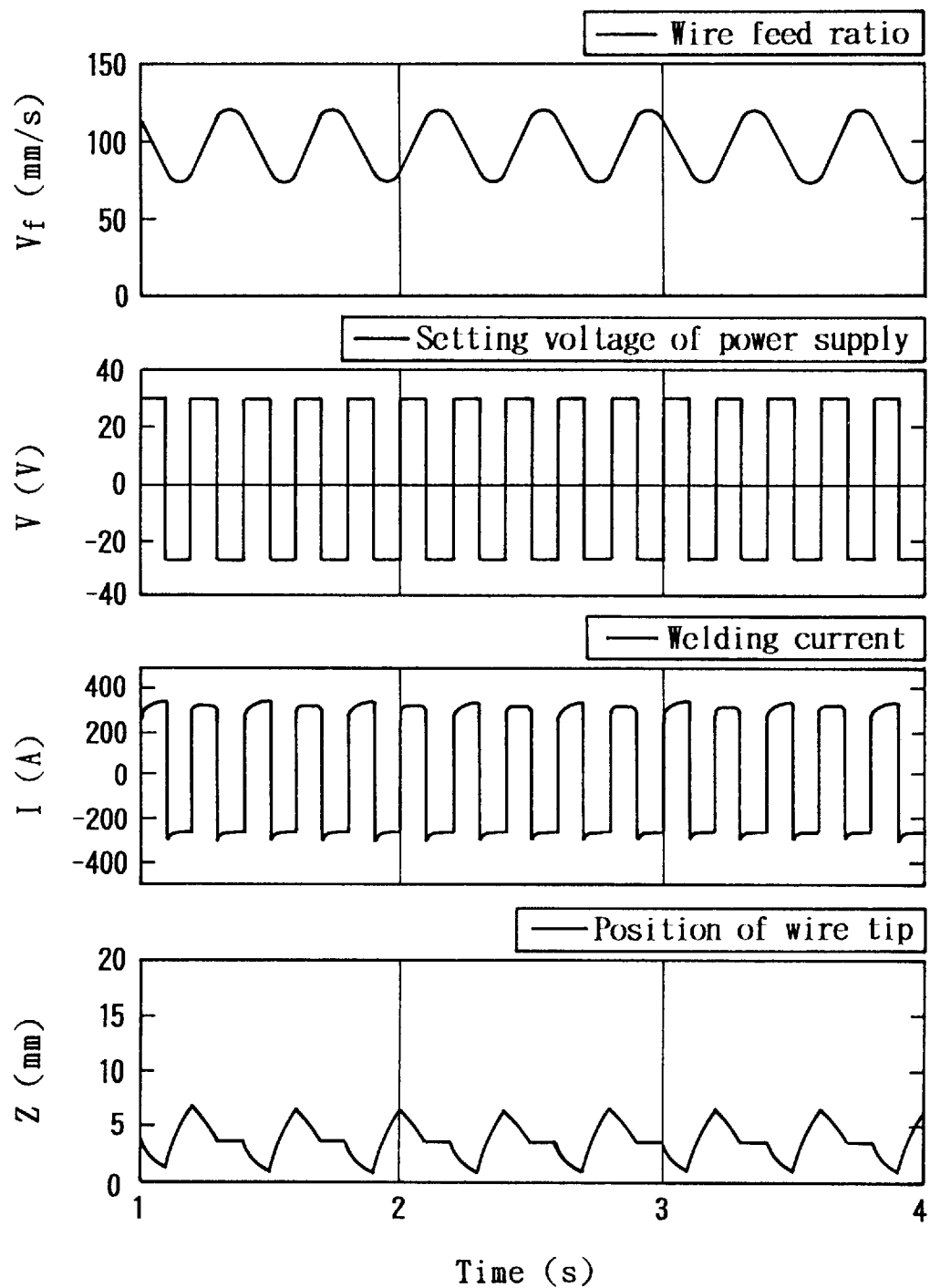

FIGS. 23, 24 and 25 exemplify the case of carrying out alternating current arc welding in place of direct current arc welding, mentioned above. This is a case in which a period of alternating current is set to 0.2 seconds and the variation period of the wire feeding rate is set to 0.4 seconds. In the case of alternating current, the welded material can effectively be melted when the wire side exhibits positive polarity. Further, when the wire side exhibits negative polarity, in comparison with the case of the positive polarity, the melting rate is increased and accordingly, the position of the distal end of the wire is complicatedly varied by the relationship between the periodic wire feed rate variation and the variation of the wire melting rate. It is known from FIGS. 13A, 13B and 13C that a phase difference of 0 constitutes the proper case in which when the distal end of the wire stays at the root portion of the groove, the wire side exhibits positive polarity (when melting current is positive) and melting of the root portion of the groove can be ensured.

Further, from these, by arbitrarily setting the welding current waveform (heat input), the heat input distribution at the groove face between the base material can be controlled further freely.

By the method of the invention, as mentioned above, the heat input distribution in the groove can freely be controlled, there can be carried out welding operation capable of simultaneously ensuring melting of the root portion of the groove and smoothing a shape of surface of a bead in a normal groove of I, V or K types as well as an ultra narrow groove having a groove width of 10 mm or less, and accordingly, there can be carried out a welding operation in which excessive weld heat is not realized and the characteristic of the base material is not deteriorated.

As has been explained in details, according to the invention, there is provided a welding system capable of freely controlling dispersion and concentration of heat input at the groove face of base material. By carrying out control of the heat input distribution of arc, melting of base metals can be ensured while restraining excessive weld heat. Further, at the same time, the heat density in welding can be reduced and therefore, a welding operation which does not deteriorate the mechanical properties of the base material can be expected.

What is claimed is:

1. An arc welding process comprising:

oscillating a weld torch through which is fed a consumable electrode that extends between members to be welded together, wherein the weld torch is oscillated along a direction of thickness of said members;

applying an arc current to weld said members together, wherein said arc current includes an arc current waveform; and controlling a difference between a phase of the oscillation of said weld torch and a phase of said arc current waveform in accordance with a change in said arc current waveform.

2. The arc welding process according to claim 1, wherein the change in said arc current waveform includes a change in said arc current.

3. The arc welding process according to claim 1, wherein the change in said arc current waveform includes a change in polarity of said consumable electrode.

4. An arc welding process comprising:

periodically varying a speed at which a consumable electrode is fed between members to be welded together, wherein said consumable electrode is fed along a direction of thickness of said members;

applying an arc current to weld said members together, wherein said arc current includes an arc current waveform; and controlling a difference between a phase of the periodic variation of the feed speed of said consumable electrode and a phase of said arc current waveform in accordance with a change in said arc current waveform.

5. The arc welding process according to claim 4, wherein the change in said arc current waveform includes a change in said arc current.

6. The arc welding process according to claim 4, wherein the change in said arc current waveform includes a change in polarity of said consumable electrode.

* * * * *